United States Patent
Salehin et al.

(10) Patent No.: US 11,743,670 B2
(45) Date of Patent: Aug. 29, 2023

(54) CORRELATION-BASED RENDERING WITH MULTIPLE DISTRIBUTED STREAMS ACCOUNTING FOR AN OCCLUSION FOR SIX DEGREE OF FREEDOM APPLICATIONS

(71) Applicant: QUALCOMM Incorporated, San Diego, CA (US)

(72) Inventors: S M Akramus Salehin, San Diego, CA (US); Nils Günther Peters, San Diego, CA (US); Siddhartha Goutham Swaminathan, San Diego, CA (US); Isaac Garcia Munoz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 276 days.

(21) Appl. No.: 17/127,004

(22) Filed: Dec. 18, 2020

(65) Prior Publication Data
US 2022/0201418 A1 Jun. 23, 2022

(51) Int. Cl.
*H04S 7/00* (2006.01)
*G10L 19/16* (2013.01)
(Continued)

(52) U.S. Cl.
CPC ............. *H04S 7/303* (2013.01); *G06F 3/165* (2013.01); *G10L 19/167* (2013.01); *H04S 1/007* (2013.01);
(Continued)

(58) Field of Classification Search
None
See application file for complete search history.

(56) References Cited

U.S. PATENT DOCUMENTS

| 5,757,927 A | 5/1998 | Gerzon et al. |
| 9,237,398 B1 | 1/2016 | Algazi et al. |
| (Continued) | | |

FOREIGN PATENT DOCUMENTS

| CN | 106714072 A | 5/2017 |
| EP | 3410747 A1 | 12/2018 |
| (Continued) | | |

OTHER PUBLICATIONS

Inverse Square Law, Sound, https://web.archive.org/web/20000617055113/http://hyperphysics.phy-astr.gsu.edu/hbase/Acoustic/invsqs.html (archived Jun. 17, 2000) (last accessed Nov. 18, 2022) ("Hyperphysics") (Year: 2000).*

(Continued)

*Primary Examiner* — Walter F Briney, III
(74) *Attorney, Agent, or Firm* — Shumaker & Sieffert, P.A.

(57) ABSTRACT

An example device includes a memory configured to store audio data and location data associated with a plurality of audio streams and one or more processors coupled to the memory. The one or more processors are configured to obtain a first location of a first audio stream that includes an audio source and obtain a second location of a second audio stream that includes the audio source. The one or more processors are configured to generate direction vectors originating at the first location and the second location, based on a location of the audio source and the first location, and the location of the audio source and the second location, respectively. The one or more processors are also configured to determine parameters that describe a vector field based on the first direction vector and the second direction vector.

39 Claims, 28 Drawing Sheets

(51) Int. Cl.
*H04S 1/00* (2006.01)
*G06F 3/16* (2006.01)

(52) U.S. Cl.
CPC ....... *H04S 2400/11* (2013.01); *H04S 2420/01* (2013.01); *H04S 2420/11* (2013.01)

(56) References Cited

U.S. PATENT DOCUMENTS

| | | | |
|---|---|---|---|
| 9,466,121 | B2 | 10/2016 | Yang et al. |
| 9,852,737 | B2 | 12/2017 | Kim et al. |
| 9,854,377 | B2 | 12/2017 | Sen et al. |
| 9,922,656 | B2 | 3/2018 | Peters et al. |
| 10,728,689 | B2 | 7/2020 | Swaminathan et al. |
| 10,924,876 | B2 | 2/2021 | Swaminathan et al. |
| 11,089,428 | B2 | 8/2021 | Salehin et al. |
| 11,356,793 | B2 | 6/2022 | Salehin et al. |
| 2004/0076301 | A1 | 4/2004 | Algazi et al. |
| 2006/0045275 | A1 | 3/2006 | Daniel |
| 2010/0305952 | A1 | 12/2010 | Mouhssine et al. |
| 2011/0249821 | A1 | 10/2011 | Jaillet et al. |
| 2012/0230497 | A1 | 9/2012 | Dressler et al. |
| 2012/0314878 | A1 | 12/2012 | Daniel et al. |
| 2013/0010971 | A1 | 1/2013 | Batke et al. |
| 2013/0236039 | A1 | 9/2013 | Jax et al. |
| 2013/0259312 | A1 | 10/2013 | Lyons et al. |
| 2014/0023197 | A1 | 1/2014 | Xiang et al. |
| 2014/0025386 | A1 | 1/2014 | Xiang et al. |
| 2015/0055808 | A1 | 2/2015 | Vennstrom et al. |
| 2015/0117664 | A1 | 4/2015 | Mossner et al. |
| 2015/0213805 | A1 | 7/2015 | Peters et al. |
| 2015/0271621 | A1 | 9/2015 | Sen et al. |
| 2015/0373471 | A1 | 12/2015 | Krueger et al. |
| 2016/0007132 | A1* | 1/2016 | Peters ................... G10L 19/008 381/17 |
| 2016/0088415 | A1 | 3/2016 | Krueger et al. |
| 2016/0093308 | A1 | 3/2016 | Kim |
| 2016/0093311 | A1 | 3/2016 | Kim et al. |
| 2016/0099001 | A1 | 4/2016 | Peters et al. |
| 2016/0104495 | A1 | 4/2016 | Peters et al. |
| 2016/0155448 | A1 | 6/2016 | Purnhagen et al. |
| 2016/0174008 | A1 | 6/2016 | Boehm et al. |
| 2016/0212538 | A1 | 7/2016 | Fullam et al. |
| 2016/0227340 | A1 | 8/2016 | Peters |
| 2016/0241980 | A1 | 8/2016 | Najaf-Zadeh et al. |
| 2016/0309273 | A1 | 10/2016 | Keiler et al. |
| 2017/0011751 | A1* | 1/2017 | Fueg ................... H04N 21/233 |
| 2017/0132480 | A1 | 5/2017 | Han |
| 2017/0188170 | A1 | 6/2017 | Prins et al. |
| 2018/0046431 | A1 | 2/2018 | Thagadur Shivappa et al. |
| 2018/0190300 | A1 | 7/2018 | Mate et al. |
| 2018/0206057 | A1 | 7/2018 | Kim et al. |
| 2018/0332420 | A1 | 11/2018 | Salume et al. |
| 2018/0338213 | A1 | 11/2018 | Lehtiniemi et al. |
| 2019/0007781 | A1 | 1/2019 | Peters et al. |
| 2019/0180509 | A1 | 6/2019 | Laaksonen et al. |
| 2019/0198028 | A1 | 6/2019 | Kim et al. |
| 2019/0200158 | A1 | 6/2019 | Verbeke et al. |
| 2019/0306651 | A1 | 10/2019 | Vilermo et al. |
| 2019/0335292 | A1 | 10/2019 | Leppanen et al. |
| 2019/0387348 | A1 | 12/2019 | Peters et al. |
| 2020/0021940 | A1* | 1/2020 | Choueiri ................... H04R 5/02 |
| 2020/0068335 | A1 | 2/2020 | Eronen et al. |
| 2020/0264006 | A1 | 8/2020 | Sommer et al. |
| 2021/0004201 | A1 | 1/2021 | Munoz et al. |
| 2021/0004452 | A1 | 1/2021 | Swaminathan et al. |
| 2021/0006922 | A1 | 1/2021 | Swaminathan et al. |
| 2021/0092546 | A1 | 3/2021 | Terentiv et al. |
| 2021/0160645 | A1 | 5/2021 | Olivieri et al. |
| 2021/0168550 | A1 | 6/2021 | Terentiv et al. |

FOREIGN PATENT DOCUMENTS

| | | |
|---|---|---|
| EP | 3506082 A1 | 7/2019 |
| WO | 2014001478 A1 | 1/2014 |
| WO | 2014042795 A2 | 3/2014 |
| WO | 2014194099 A1 | 12/2014 |
| WO | 2015116666 A1 | 8/2015 |
| WO | 2015175981 A1 | 11/2015 |
| WO | 2016057646 A1 | 4/2016 |
| WO | 2018064528 A1 | 4/2018 |
| WO | 2019197403 A1 | 10/2019 |

OTHER PUBLICATIONS

International Search Report and Written Opinion—PCT/US2021/063862—ISA/EPO—dated Apr. 25, 2022 17 Pages.

Joseph T., et al., "Performance of Linear Extrapolation Methods for Virtual Sound Field Navigation", Journal of the Audio Engineering Society, vol. 68, No. 3, Mar. 1, 2020 (Mar. 1, 2020 ), pp. 138-156, XP055909731, US ISSN: 1549-4950, DOI: 10.17743/jaes.2019.0054, Retrieved from the Internet: URL: https://www.aes.org/tmpFiles/elib/20220406/20725.pdf.

Jurgen H., "MPEG-H Audio—The New Standard for Universal Spatial/3D Audio Co", JAES, AES, 60 East 42nd Street, Room 2520 New York, 10165-2520, USA, vol. 62, No. 12, Jan. 5, 2015 (Jan. 5, 2015), pp. 821-830, XP040670747.

Pomberger H., et al., "Warping of 3D Ambisonic Recordings", Ambisonic Symposium 2011, Jun. 2, 2011 (Jun. 2, 2011), XP055014360, pp. 1-8, Lexington.

Tylka et al., "Soundfield Navigation using an Array of Higher-Order Ambisonics Microphones", Conference: 2016 AES International Conference on Audio for Virtual and Augmented Reality, Audio Engineering Society, Conference Paper, Presented at the Conference on Audio for Virtual and Augmented Reality, Sep. 30-Oct. 1, 2016, Los Angeles, CA, USA, XP040681032.

Audio: "Call for Proposals for 3D Audio", International Organisation for Standardisation Organisation Internationale De Normalisation, ISO/IEC JTC1/SC29/WG11, Coding of Moving Pictures and Audio, ISO/IEC JTC1/SC29/WG11/N13411, Geneva, Jan. 2013, pp. 1-20.

Co-Pending U.S. Appl. No. 16/696,798, inventor Salehin; S. M. Akramus, filed Nov. 26, 2019.

ETSI TS 103 589 V1.1.1, "Higher Order Ambisonics (HOA) Transport Format", Jun. 2018, 33 pages.

Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.

Hollerweger F., "An Introduction to Higher Order Ambisonic", Oct. 2008, pp. 1-13, Accessed online [Jul. 8, 2013].

"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.

"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.

ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].

Marsden J.E., and Tromba A.J., Vector Calculus, Macmillan, 2003, 5 pages.

Peterson J., et al., "Virtual Reality, Augmented Reality, and Mixed Reality Definitions", EMA, version 1.0, Jul. 7, 2017, 4 Pages.

Poletti M.A., "Three-Dimensional Surround Sound Systems Based on Spherical Harmonics", The Journal of the Audio Engineering Society, vol. 53, No. 11, Nov. 2005, pp. 1004-1025.

(56) References Cited

OTHER PUBLICATIONS

Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), San Jose, USA, XP030060280, 83 Pages, p. 11, paragraph 5.2.4-paragraph 5.2.5 p. 16, paragraph 6.1.10—p. 17; Figure 4 p. 18, paragraph 6.3—p. 22, Paragraph 6.3.2.2 p. 64, paragraph B.1—p. 66, Paragraph B.2.1; figures B.1, B.2 p. 70, paragraph B.2.1.3—p. 71 p. 74, paragraph B.2.4.1—p. 75, Paragraph B.2.4.2.

Sen D., et al., "Technical Description of the Qualcomm's HoA Coding Technology for Phase II", 109th MPEG Meeting, Jul. 7, 2014-Nov. 7, 2014, Sapporo, (Motion Picture Expert Group or ISO/IEC JTC1/SC29/WG11), No. M34104, Jul. 2, 2014 (Jul. 2, 2014), XP030062477, 4 Pages, figure 1.

Co-pending U.S. Appl. No. 17/038,618, inventor Salehin; S. M. Akramus, filed Sep. 30, 2020.

Co-pending U.S. Appl. No. 16/714,150, inventor Salehin; S. M. Akramus, filed Dec. 13, 2019.

Co-pending U.S. Appl. No. 16/513,436, inventor Siddhartha Goutham Swaminathan, filed Jan. 23, 2020.

Salehin A., (Qualcomm) et al., "6DOF Processing for HOA Content", 120. MPEG Meeting, Oct. 23, 2017-Oct. 27, 2017, MACAU, (Motion Picture Expert Group or ISO/IEC JTC1/SC29/WG11), No. M41734, Oct. 19, 2017 (Oct. 19, 2017), XP030070076, 4 Pages, Retrieved from the Internet: URL: http://phenix.int-evry.fr/mpeg/doc_end_user/documents/120_Macau/wg11/m41734-v1-M41734.zip M41734.docx [Retrieved on Oct. 19, 2017].

"3rd Generation Partnership Project; Technical Specification Group Services and System Aspects; Virtual Reality (VR) media services over 3GPP; (Release 14)", S4-170413 TR 26.918 Virtual Reality (VR) Media Services Over 3GPP v0.6.0 RM,_3rd Generation Partnership Project, Mobile Competence Centre ; 650, Route Des Lucioles; F-06921 Sophia-A , Apr. 28, 2017, XP051259891, 61 pages.

"Digital Audio" Wikipedia, the free encyclopedia, retrieved from https://en.wikipedia.org/wiki/Digital_audio, Oct. 18, 2017, 4 pp.

"Digital Signal Processing" Wikipedia, the free encyclopedia, retrieved from https://en.wikipedia.org/wiki/Digital_signal_processing, Jun. 21, 2017, 12 pp.

"Information technology—High efficiency coding and media delivery in heterogeneous environments—Part 3: 3D Audio," ISO/IEC JTC 1/SC 29N, Jul. 25, 2005, 311 pp.

ISO/IEC JTC 1/SC 29/WG 6, "MPEG-I Immersive Audio Encoder Input Format, Version 3", International Organization for Standardization ISO/IEC JTC1/SC29/WG6, MPEG Audio Coding, ISO/IEC JTC1/SC29/WG6 N0169, Oct. 2022, Hybrid Mainz & Virtual, 38 pages.

Kronlachner M., et al., "Spatial Transformations for the Enhancement of Ambisonic Recordings", Jan. 2014, 5 pages.

Marschall M., et al., "Sound-Field Reconstruction Performance of a Mixed-Order Ambisonics Microphone Array", Proceedings of Meetings on Acoustics, vol. 19, No. 1, 2013, pp. 1-2. (Applicant points out, in accordance with MPEP 609.04(a), that the year of publication, 2013, is sufficiently earlier than the effective U.S. filing date, so that the particular month of publication is not an issue.).

Munoz I., "Proposed 6DoF HOA Scenes", International Organisation for Standardisation ISO/IEC JTC1/SC29/WG6, MPEG Audio Coding, ISO/IEC JTC1/SC29/WG6 M61160, Oct. 2022, Mainz, 5 Pages.

Prosecution History for U.S. Appl. No. 16/513,436 dated from Jul. 16, 2019, 148 Pages.

Salehin S.M.A., et al., "Thoughts on Rendering Interior Ambisonic Sound Fields", Coding of Moving Pictures and Audio, ISO/IEC JTC1/SC29/WG11 MPEG2019/M49394, Jul. 2019, Gothenburg, Sweden, 3 Pages.

WG11: "Proposed Draft 1.0 of TR: Technical Report on Architectures for Immersive Media", ISO/IEC JTC1/SC29/WG11/N17685, San Diego, US, Apr. 2018, 14 pages.

Zotter F., et al., "Warping of the Recording Angle in Ambisonics", Jan. 2011, 4 Pages.

\* cited by examiner

CORRELATION-BASED RENDERING WITH MULTIPLE DISTRIBUTED STREAMS ACCOUNTING FOR AN OCCLUSION FOR SIX DEGREE OF FREEDOM APPLICATIONS

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture and rendering of an acoustical space for extended reality systems. In particular, this disclosure relates to rendering techniques with multiple distributed streams for use in six degrees of freedom (6DoF) applications.

In one example, various aspects of the techniques are directed to a device including a memory configured to store audio data and location data associated with a plurality of audio streams and one or more processors coupled to the memory, and configured to: obtain a first location of a first audio stream that includes an audio source; obtain a second location of a second audio stream that includes the audio source; generate a first direction vector originating at the first location, based on a location of the audio source and the first location, and an inverse based on an energy of the audio source at the first location; generate a second direction vector originating at the second location, based on the location of the audio source and the second location, and an inverse based on an energy of the audio source at the second location; and determine parameters that describe a vector field based on the first direction vector and the second direction vector.

In another example, various aspects of the techniques are directed to a method including obtaining a first location of a first audio stream that includes an audio source, obtaining a second location of a second audio stream that includes the audio source, generating a first direction vector originating at the first location, based on a location of the audio source and the first location, and an inverse based on an energy of the audio source at the first location, generating a second direction vector originating at the second location, based on the location of the audio source and the second location, and an inverse based on an energy of the audio source at the second location, and determining parameters that describe a vector field based on the first direction vector and the second direction vector.

In another example, various aspects of the techniques are directed to a non-transitory computer-readable storage medium having stored thereon instructions that, when executed, cause one or more processors to obtain a first location of a first audio stream that includes an audio source; obtain a second location of a second audio stream that includes the audio source; generate a first direction vector originating at the first location, based on a location of the audio source and the first location, and an inverse based on an energy of the audio source at the first location; generate a second direction vector originating at the second location, based on the location of the audio source and the second location, and an inverse based on an energy of the audio source at the second location; and determine parameters that describe a vector field based on the first direction vector and the second direction vector.

In another example, various aspects of the techniques are directed to a device including means for obtaining a first location of a first audio stream that includes an audio source, means for obtaining a second location of a second audio stream that includes the audio source, means for generating a first direction vector originating at the first location, based on a location of the audio source and the first location, and an inverse based on an energy of the audio source at the first location, means for generating a second direction vector originating at the second location, based on the location of the audio source and the second location, and an inverse based on an energy of the audio source at the second location, and means for determining parameters that describe a vector field based on the first direction vector and the second direction vector.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
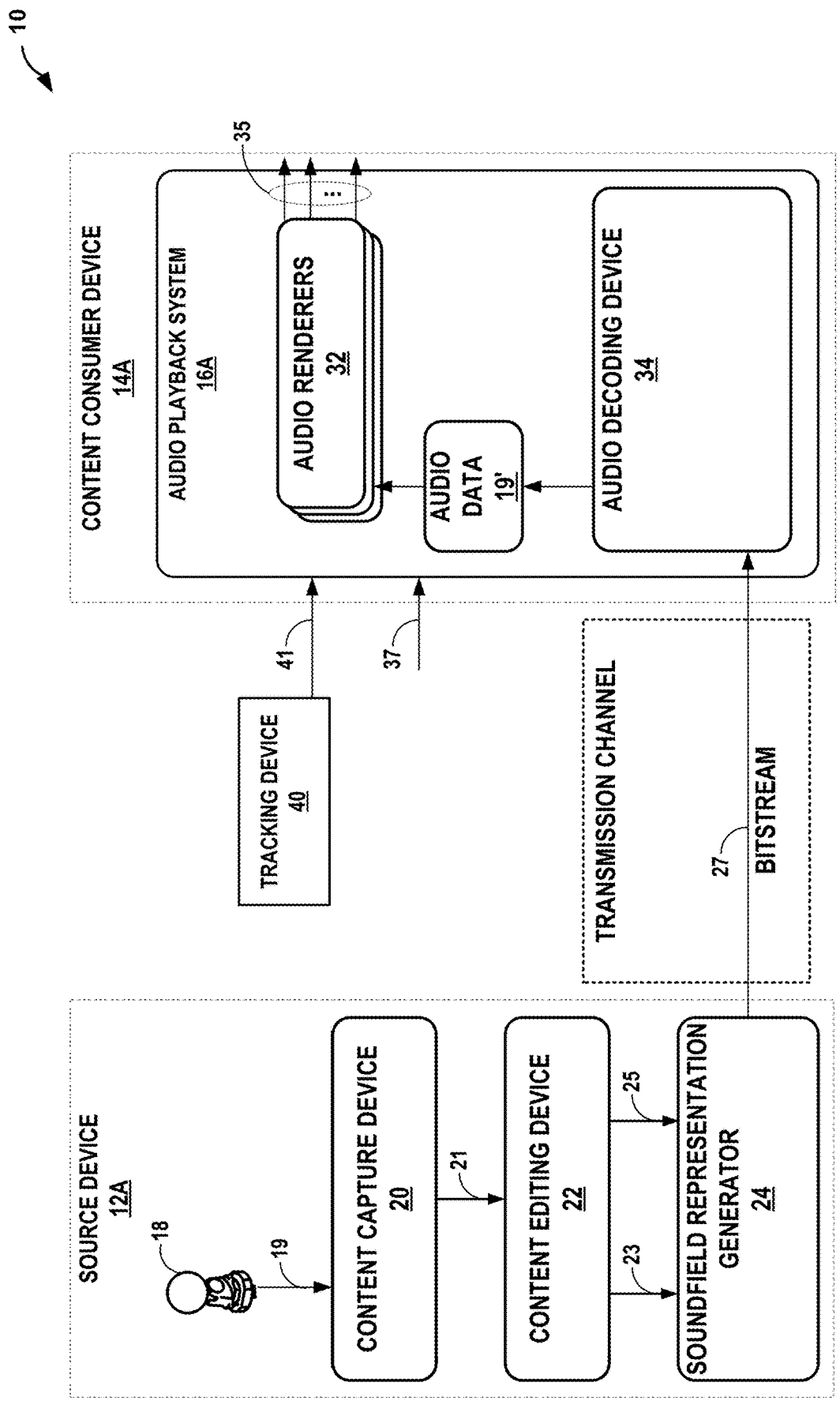
FIGS. 1A-1C are diagrams illustrating systems that may perform various aspects of the techniques described in this disclosure.

When a listener who is using an XR, VR, AR or MR system moves locations, the soundfield being rendered should change to reflect that movement and provide an immersive experience. For example, if an audio source is directly in front of the listener and the listener moves to the left of the audio source, that audio source should now appear to be in front of and to the right of the listener. Typical techniques, such as energy-based interpolation, used to change the soundfield to reflect the movement of the listener may be computationally complex and may not provide an acceptable auditory experience. According to the techniques of this disclosure, audio source locations may be identified in a relatively low computational manner and the audio source directions and amplitude at the new user location may be estimated using vector field interpolation.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include information, such as metadata, identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate three-dimensional (3D) localization of audio sources within the soundfield. As such, XR devices may render the ambisonic coefficients to speaker feeds that, when played via one or more speakers, accurately reproduce the soundfield.

As another example, the ambisonic coefficients may be translated (e.g., rotated) to account for user movement without overly complex mathematical operations, thereby potentially accommodating the low latency requirements of XR. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of a user or viewed as would be done when normally using the mobile device. As such, any information on the screen can be part of the mobile device. The mobile device may be able to provide tracking information and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world). Additionally, while a displayed world is mentioned in various examples of the present disclosure, the techniques of this disclosure may also be used with an acoustical space that does not correspond to a displayed world or where there is no displayed world.

Figure 1B:
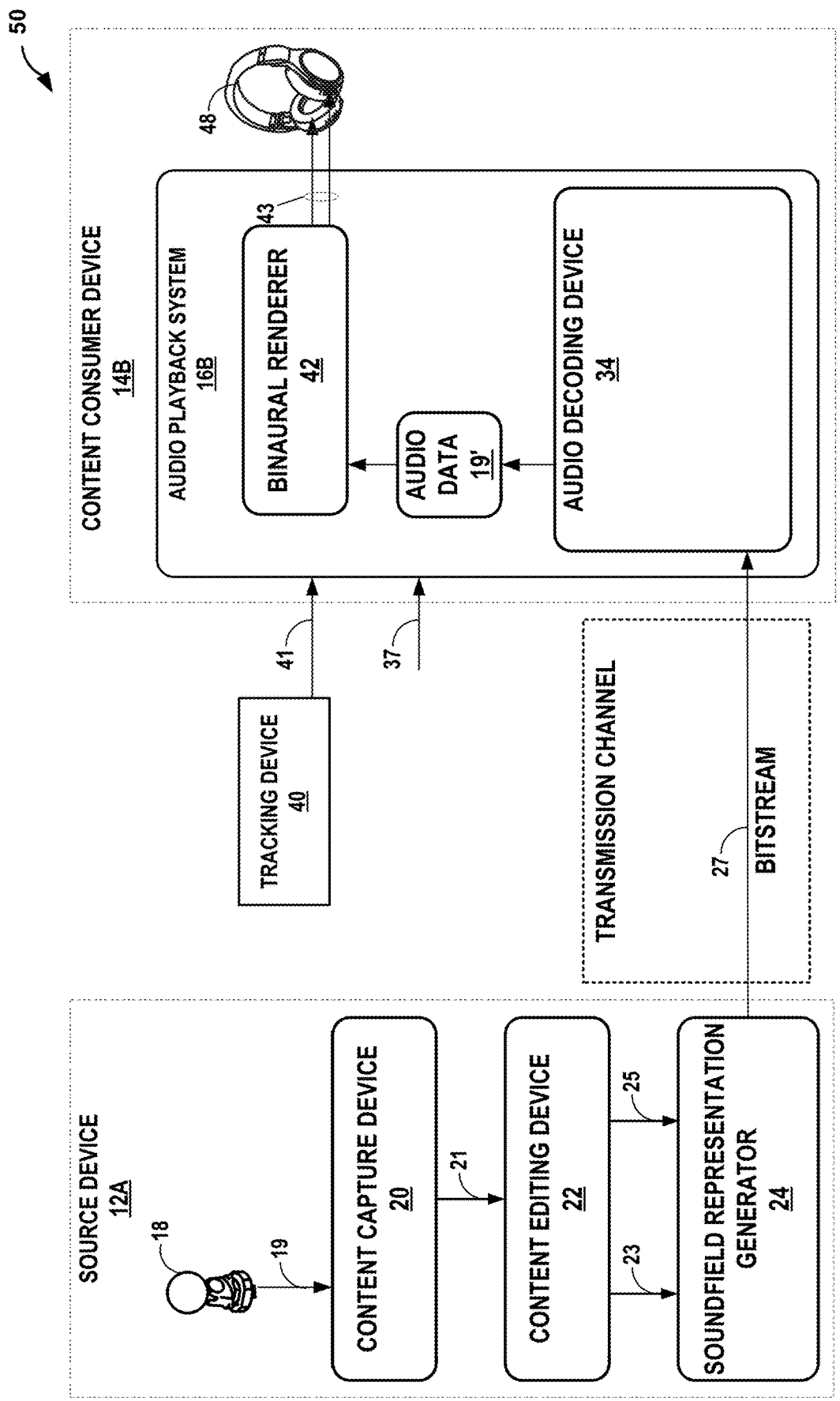
Figure 1C:
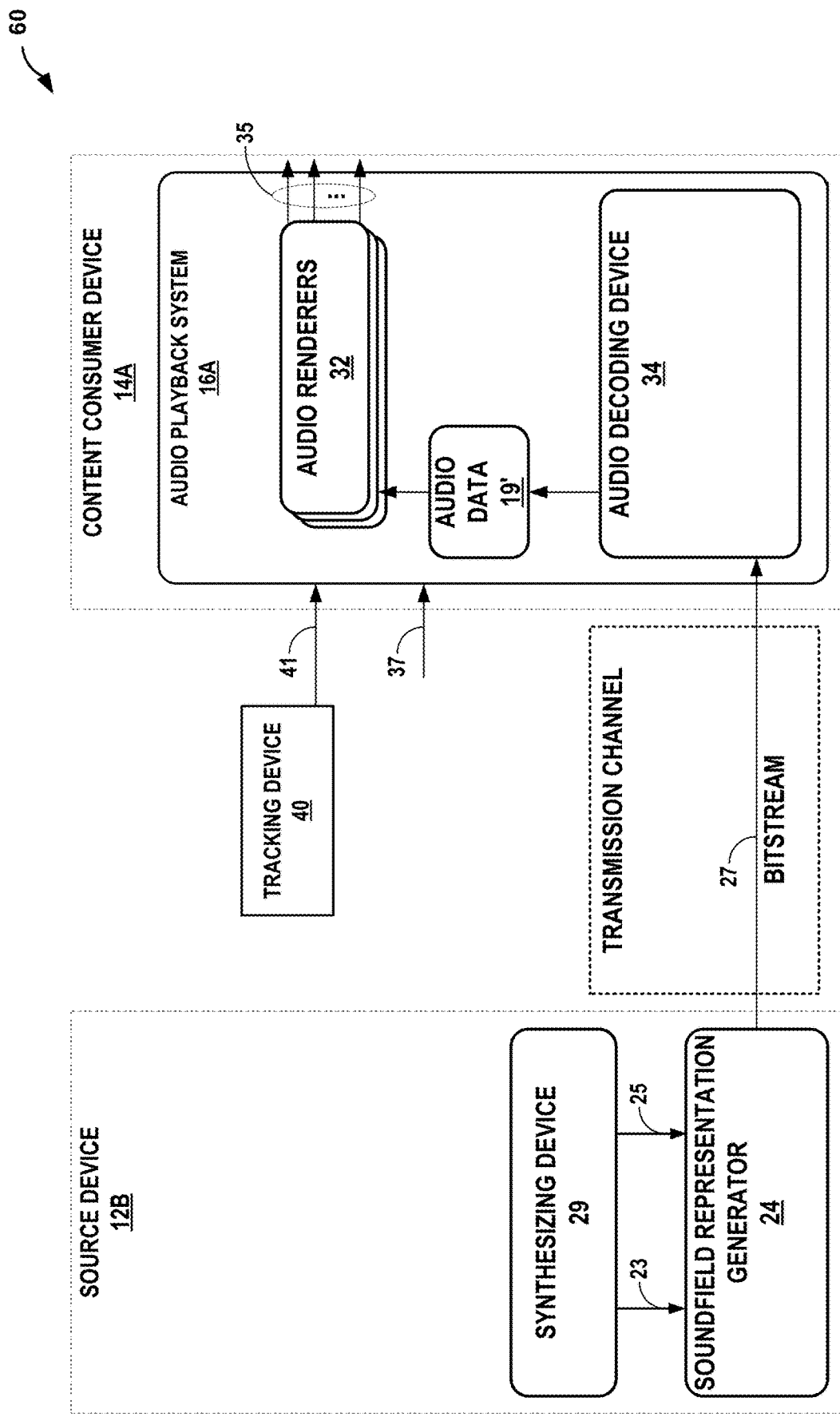

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data. Moreover, the source device 12A may represent any form of computing device capable of generating the representation of a soundfield, and is generally described herein in the context of being a VR content creator device. Likewise, the content consumer device 14A may represent any form of computing device capable of implementing rendering techniques described in this disclosure as well as audio playback, and is generally described herein in the context of being a VR client device.

The source device 12A may be operated by an entertainment company or other entity that may generate multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as the audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via the microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter the content 21 received from the content capture device 20, including the audio data 19. The content editing device 22 may output edited content 23 and associated audio information 25, such as metadata, to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and the audio information 25, provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the edited content 23 and the audio information 25.

For instance, to generate the different representations of the soundfield using ambisonic coefficients (which again is one example of the audio data 19), the soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data" or "FoA audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

In some examples, the soundfield representation generator 24 may represent an audio encoder configured to compress or otherwise reduce a number of bits used to represent the content 21 in the bitstream 27. Although, while not shown, in some examples soundfield representation generator may include a psychoacoustic audio encoding device that conforms to any of the various standards discussed herein.

In this example, the soundfield representation generator 24 may apply a linear invertible transform, such as a singular value decomposition (SVD), to the ambisonic coefficients to determine a decomposed version of the ambisonic coefficients. The decomposed version of the ambisonic coefficients may include one or more of predominant audio signals and one or more corresponding spatial components describing spatial characteristics, e.g., a direction, shape, and width, of the associated predominant audio signals. As such, the soundfield representation generator 24 may apply the decomposition to the ambisonic coefficients to decouple energy (as represented by the predominant audio signals) from the spatial characteristics (as represented by the spatial components).

The soundfield representation generator 24 may analyze the decomposed version of the ambisonic coefficients to identify various parameters, which may facilitate reordering of the decomposed version of the ambisonic coefficients. The soundfield representation generator 24 may reorder the decomposed version of the ambisonic coefficients based on the identified parameters, where such reordering may improve coding efficiency given that the transformation may reorder the ambisonic coefficients across frames of the ambisonic coefficients (where a frame commonly includes M samples of the decomposed version of the ambisonic coefficients and M is, in some examples).

After reordering the decomposed version of the ambisonic coefficients, the soundfield representation generator 24 may select one or more of the decomposed versions of the ambisonic coefficients as representative of foreground (or, in other words, distinct, predominant or salient) components of the soundfield. The soundfield representation generator 24 may specify the decomposed version of the ambisonic coefficients representative of the foreground components (which may also be referred to as a "predominant sound signal," a "predominant audio signal," or a "predominant sound component") and associated directional information (which may also be referred to as a "spatial component" or, in some instances, as a so-called "V-vector" that identifies spatial characteristics of the corresponding audio object). The spatial component may represent a vector with multiple different elements (which in terms of a vector may be referred to as "coefficients") and thereby may be referred to as a "multidimensional vector."

The soundfield representation generator 24 may next perform a soundfield analysis with respect to the ambisonic coefficients in order to, at least in part, identify the ambisonic coefficients representative of one or more background (or, in other words, ambient) components of the soundfield. The background components may also be referred to as a "background audio signal" or an "ambient audio signal." The soundfield representation generator 24 may perform energy compensation with respect to the background audio signal given that, in some examples, the background audio signal may only include a subset of any given sample of the ambisonic coefficients (e.g., such as those corresponding to zero and first order spherical basis functions and not those corresponding to second or higher order spherical basis functions). When order-reduction is performed, in other words, the soundfield representation generator 24 may augment (e.g., add/subtract energy to/from) the remaining background ambisonic coefficients of the ambisonic coefficients to compensate for the change in overall energy that results from performing the order reduction.

The soundfield representation generator 24 may perform a form of interpolation with respect to the foreground directional information (which is another way of referring to the spatial components) and then perform an order reduction with respect to the interpolated foreground directional information to generate order reduced foreground directional information. The soundfield representation generator 24 may further perform, in some examples, a quantization with respect to the order reduced foreground directional information, outputting coded foreground directional information. In some instances, this quantization may comprise a scalar/entropy quantization possibly in the form of vector quantization. The soundfield representation generator 24 may then output the intermediately formatted audio data as the background audio signals, the foreground audio signals, and the quantized foreground directional information, to in some examples a psychoacoustic audio encoding device.

In any event, the background audio signals and the foreground audio signals may comprise transport channels in some examples. That is, the soundfield representation generator 24 may output a transport channel for each frame of the ambisonic coefficients that includes a respective one of the background audio signals (e.g., M samples of one of the ambisonic coefficients corresponding to the zero or first order spherical basis function) and for each frame of the foreground audio signals (e.g., M samples of the audio objects decomposed from the ambisonic coefficients). The soundfield representation generator 24 may further output side information (which may also be referred to as "sideband information") that includes the quantized spatial components corresponding to each of the foreground audio signals.

Collectively, the transport channels and the side information may be represented in the example of FIG. 1A as ambisonic transport format (ATF) audio data (which is another way to refer to the intermediately formatted audio data). In other words, the AFT audio data may include the transport channels and the side information (which may also be referred to as "metadata"). The ATF audio data may conform to, as one example, an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018 June). As such, the ATF audio data may be referred to as HTF audio data.

In the example where the soundfield representation generator 24 does not include a psychoacoustic audio encoding device, the soundfield representation generator 24 may then transmit or otherwise output the ATF audio data to a psychoacoustic audio encoding device (not shown). The psychoacoustic audio encoding device may perform psychoacoustic audio encoding with respect to the ATF audio data to generate a bitstream 27. The psychoacoustic audio encoding device may operate according to standardized, open-source, or proprietary audio coding processes. For example, the psychoacoustic audio encoding device may perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA). The source device 12A may then transmit the bitstream 27 via a transmission channel to the content consumer device 14A.

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 and the soundfield representation generator 24, the content capture device 20 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding.

In some examples, the content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or third order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14A may be operated by an individual, and may represent a VR client device. Although described with respect to a VR client device, the content consumer device 14A may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14A. As shown in the example of FIG. 1A, the content consumer device 14A includes an audio playback system 16A, which may refer to any form of audio playback system capable of rendering the audio data for playback as multi-channel audio content.

While shown in FIG. 1A as being directly transmitted to the content consumer device 14A, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may comprise a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14A, requesting the bitstream 27.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14A includes the audio playback system 16A. The audio playback system 16A may represent any system capable of playing back multi-channel audio data. The audio playback system 16A may include a number of different renderers 32. The renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA Transport Format (HTF). More information regarding the HTF can be found in, as noted above, a Technical Specification (TS) by the European Telecommunications Standards Institute (ETSI) entitled "Higher Order Ambisonics (HOA) Transport Format," ETSI TS 103 589 V1.1.1, dated June 2018 (2018 June), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause a transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations thereof of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translation movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

Currently, content consumer devices may use energy-based interpolation for rendering audio at a user location. However, with energy-based interpolation, dealing with nearfield audio streams (e.g., the audio stream 150B) is difficult. Additionally, manipulating the amplitude and direction of the audio streams is also difficult. In some cases, using energy-based interpolation may lead to a blurred interpolation of the resulting soundfield. Another technique that may be used for rendering the soundfield is to use plane wave translation. However, with plane wave translation alone, dealing with nearfield audio streams (e.g., the audio stream 150B) is difficult. Plane wave translation may also cause high comb filtering effects, which may lead to a listener experiencing an undesired reverbing sound.

Content consumer device 14A may be an example device configured to obtain a first location of a first audio stream that includes an audio source, obtain a second location of a second audio stream that includes the audio source, generate a first direction vector originating at the first location, based on a location of the audio source and the first location, and an inverse based on an energy of the audio source at the first location, generate a second direction vector originating at the second location, based on the location of the audio source and the second location, and an inverse based on an energy of the audio source at the second location, and determine parameters that describe a vector field based on the first direction vector and the second direction vector.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 (in audio playback system 16B of content consumer device 14B) capable of performing binaural rendering using one or more head-related transfer functions (HRTFs) or the other functions capable of rendering to left and right speaker feeds 43.

The audio playback system 16B may output the left and right speaker feeds 43 to headphones 48, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

Content consumer device 14B may be an example device configured to obtain a first location of a first audio stream that includes an audio source, obtain a second location of a second audio stream that includes the audio source, generate a first direction vector originating at the first location, based on a location of the audio source and the first location, and an inverse based on an energy of the audio source at the first location, generate a second direction vector originating at the second location, based on the location of the audio source and the second location, and an inverse based on an energy of the audio source at the second location, and determine parameters that describe a vector field based on the first direction vector and the second direction vector.

FIG. 1C is a block diagram illustrating another example system 60. The example system 60 is similar to the example system 10 of FIG. 1A, however source device 12B of system 60 does not include a content capture device. Source device 12B contains synthesizing device 29. Synthesizing device 29 may be used by a content developer to generate synthesized audio streams. The synthesized audio streams may have location information associated therewith that may identifying a location of the audio stream relative to a listener or other point of reference in the soundfield, such that the audio stream may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s). Hereinafter, for simplicity purposes, a source device 12A or 12B may be referred to as source device 12.

Figure 2:
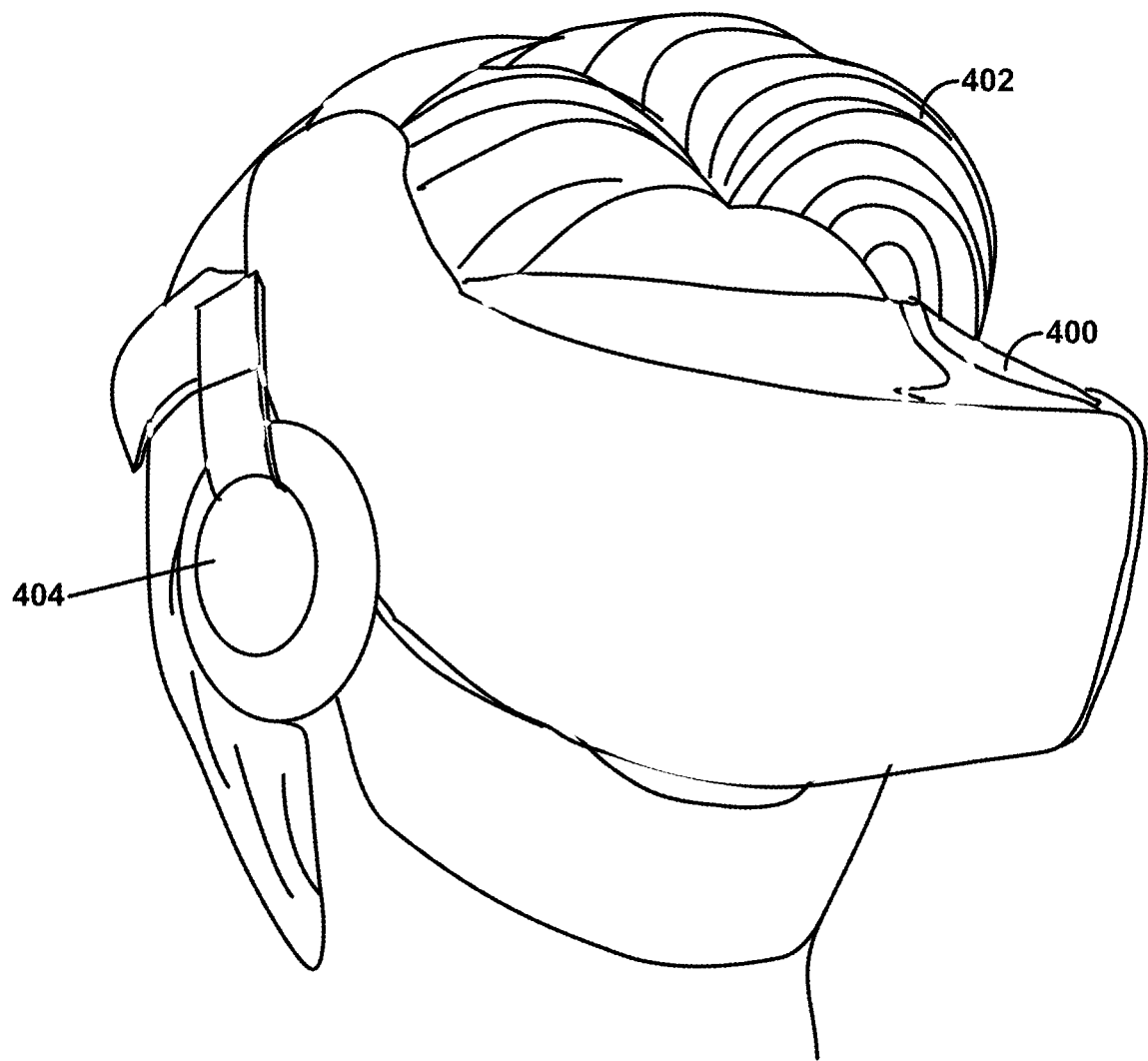
FIG. 2 is a diagram illustrating an example of a VR device worn by a user.

As described above, the content consumer device 14A or 14B (for simplicity purposes, either of which may hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 400 worn by a user 402. The VR device 400 is coupled to, or otherwise includes, headphones 404, which may reproduce a soundfield represented by the audio data 19' through playback of the speaker feeds 35. The speaker feeds 35 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may include a tracking device (e.g., the tracking device 40) that is configured to track head movement of the user 402, and adapt the video data shown via the VR headset 400 to account for the head movements, providing an immersive experience in which the user 402 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 402 to reside in the virtual world visually, often the VR headset 400 may lack the capability to place the user in the displayed world audibly. In other words, the VR system (which may include a computer responsible for rendering the video data and audio data—that is not shown in the example of FIG. 2 for ease of illustration purposes, and the VR headset 400) may be unable to support full three-dimension immersion audibly (and in some instances realistically in a manner that reflects the displayed scene presented to the user via the VR headset 400).

While described in this disclosure with respect to the VR device, various aspects of the techniques of this disclosure may be performed in the context of other devices, such as a mobile device. In this instance, the mobile device (such as a so-called smartphone) may present the displayed world via a display, which may be mounted to the head of the user 402 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which, for simplicity purposes, is hereinafter referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Figure 3:
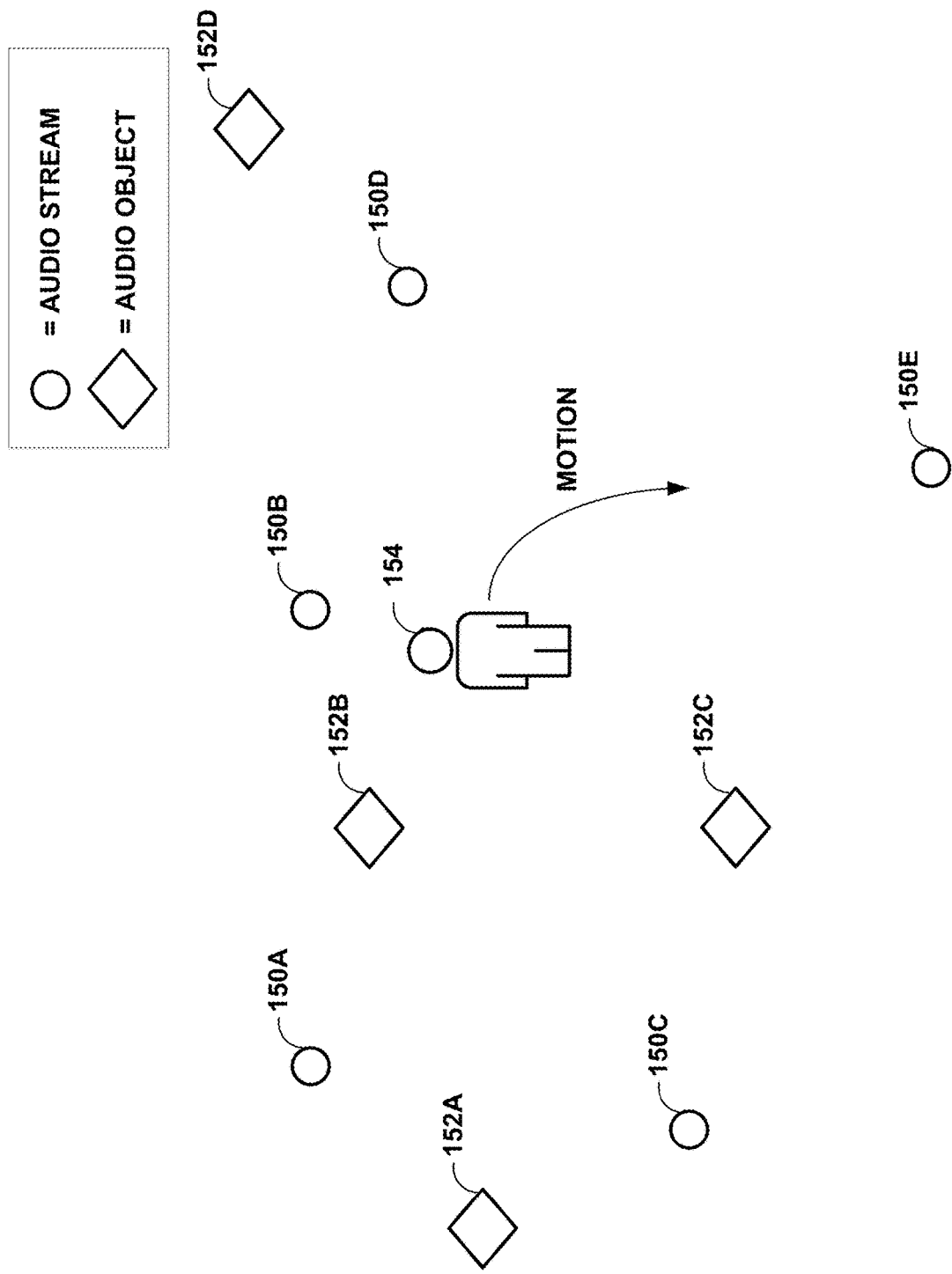
FIG. 3 is a conceptual diagram illustrating an example audio scene.

FIG. 3 is a conceptual diagram illustrating an example audio scene. In the example of FIG. 3, audio streams 150A-150E, and audio objects 152A-152D are shown surrounding listener 154. Each of the audio streams 150A-150E and each of the audio objects 152A-152D may represent audio captured by one or more microphones or synthesized audio signals generated, for example, by a computer. In an immersive VR, AR or XR experience, the content consumer device 14 may render the audio scene such that the audio associated with each of the audio streams 150A-150E and/or each of the audio objects 152A-152D may appear to be originating from the relative location shown in FIG. 3. When the listener 154 moves, in order to maintain an immersive VR, AR, or XR experience, the rendered audio scene may need to change to account for the movement of the listener 154 relative to each of the audio streams 150A-150E and/or each of the audio objects 152A-152D. While audio streams and audio objects may be discussed herein as being different, an audio stream should be understood to be an audio stream or an audio object.

For example, in 6DoF VR/AR/XR applications there may be multiple audio streams from different positions which are processed to render a soundfield at the listener position. One technique for rendering the soundfield is to use energy-based interpolation. However, with energy-based interpolation, dealing with nearfield audio streams (e.g., the audio stream 150B) is difficult. Additionally, manipulating the amplitude and direction of the audio streams is also difficult. In some cases, using energy-based interpolation may lead to a blurred interpolation of the resulting soundfield.

Another technique for rendering the soundfield is to use plane wave translation. However, with plane wave translation alone, dealing with nearfield audio streams (e.g., the audio stream 150B) is difficult. Plane wave translation may also cause high comb filtering effects, which may lead to a listener experiencing an undesired reverbing sound.

Figure 4:
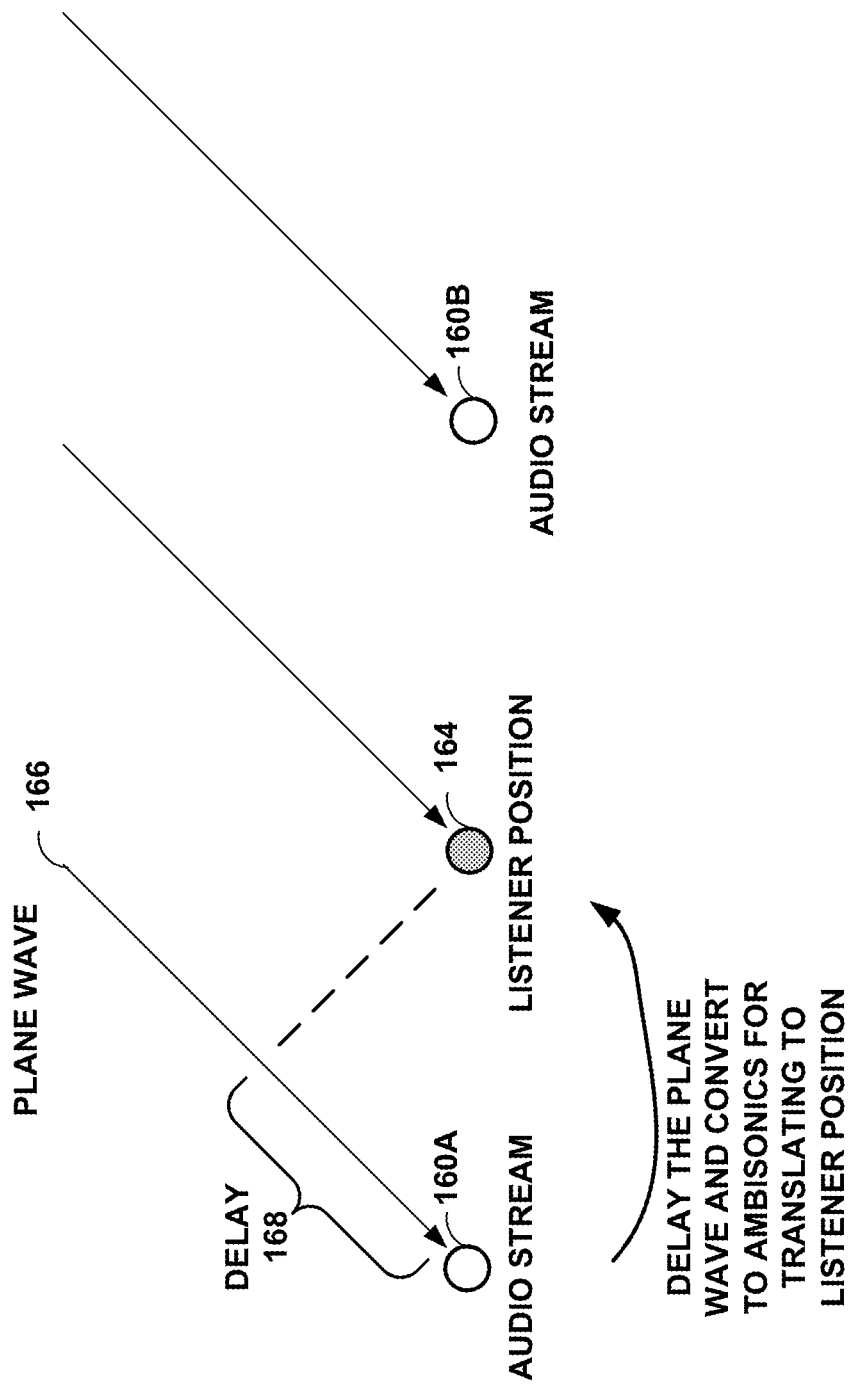
FIG. 4 is a conceptual diagram illustrating example plane wave techniques according to this disclosure.

FIG. 4 is a conceptual diagram illustrating example plane wave techniques according to this disclosure. According to the techniques of this disclosure, audio source locations may be identified in a relatively low computational manner and the audio source directions and amplitude may be estimated using vector field interpolation. For example, the content consumer device 14 (e.g., one of the content consumer devices 14A or 14B shown in the examples of FIGS. 1A-1C) may convert ambisonics to a sum of plane waves: $\Sigma_{nm}\alpha_{nm}Y_m^n(\Omega)=\Sigma_j\beta_j P(\Phi_j)$ where $P(\Phi_j)$ are the plane wave basis functions using, for example, Fliege sampling points. Fliege sampling points are sampling points equally spaced on a sphere. The content consumer device 14 may use a plane wave translation technique with vector field interpolation to translate the ambisonics soundfield to the listener position. The content consumer device 14 may convert each of the audio streams back to ambisonics. For example, the content consumer device 14 may delay the plane wave and convert to ambisonics to translate an audio stream to the listener position.

For example, the content consumer device 14 may translate the audio stream 160A to a plane wave 166 and delay the plane wave 166 associated with the audio stream 160A by a delay 168. The content consumer device 14 may then convert the plane wave 166 to ambisonics. The content consumer device 14 may use the technique to translate the audio stream 160A to the listener position 164. This technique may be repeated for other audio streams, such as the audio stream 160B.

Figure 5:
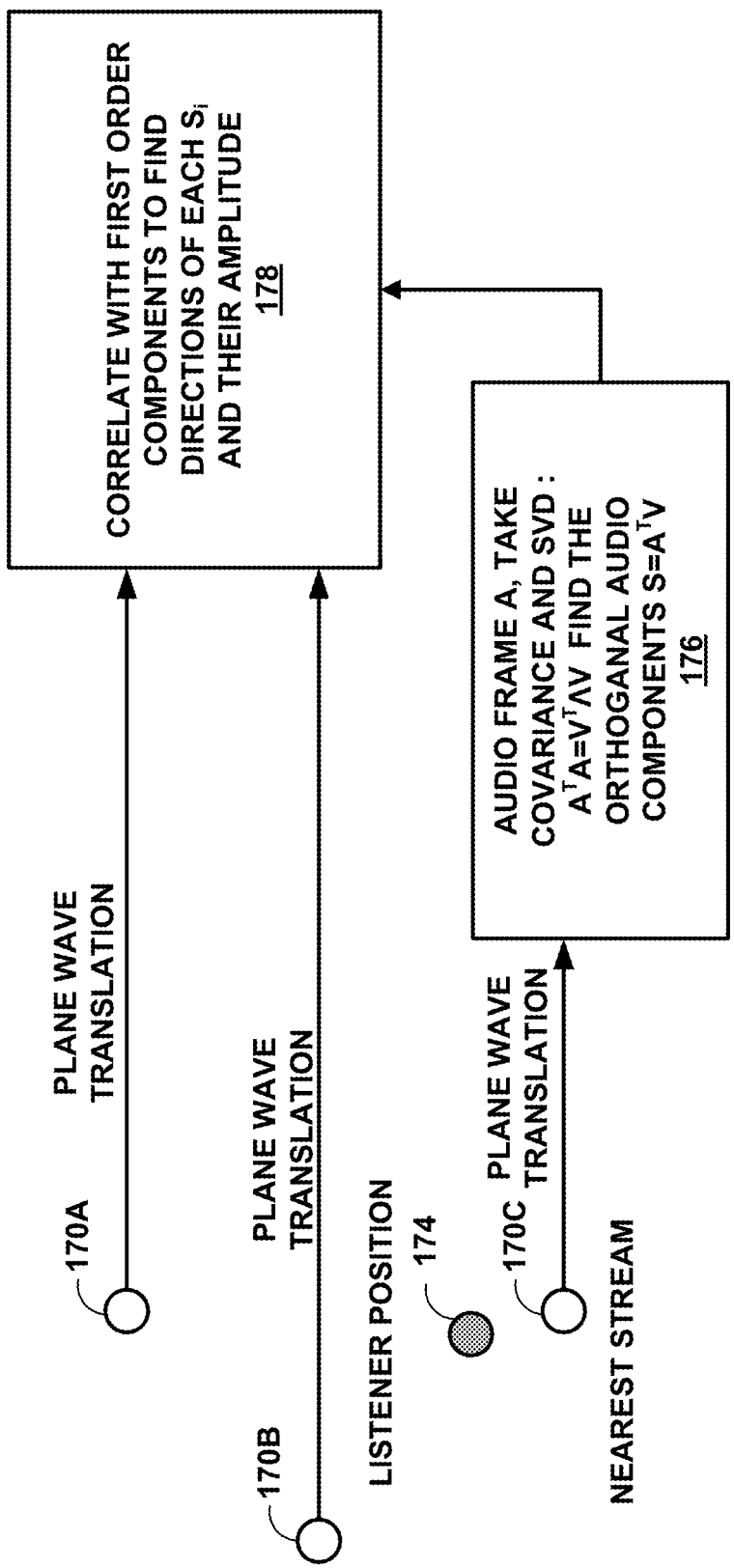
FIG. 5 is a conceptual diagram illustrating an example of using plane wave translation according to the techniques of this disclosure.

FIG. 5 is a conceptual diagram illustrating an example of using plane wave translation according to the techniques of this disclosure. Audio streams 170A-170C are depicted in relationship to listener position 174. As shown in the example of FIG. 5, the nearest audio stream to the listener position 174 is the audio stream 170C. In the example of FIG. 5, the content consumer device 14 may treat a nearest audio stream differently than other audio streams. For example, the content consumer device 14 may find the nearest audio stream 170C. For example, the content consumer device 14 may determine the nearest audio stream 170C as the content consumer device 14 may have information indicative of the listener position and location metadata indicative of the location of each of the audio streams 170A-170C.

The content consumer device 14 may, for an audio frame A of the nearest audio stream 170C, based on a covariance and an SVD ($A^T A = V^T \Lambda V$) find the orthogonal audio components $S = A^T V$ (176). For example, through the SVD, the content consumer device 14 may separate out different audio sources represented in the nearest audio stream 170C. For example, multiple audio sources may interfere with each other and the SVD may separate the directions for the different audio sources. Content consumer device 14 may correlate the first order components of the other audio streams (e.g., audio stream 170A and audio stream 170B) with the orthogonal audio components of the nearest audio stream 170C to find directions of each $S_i$ and their amplitude (178). In some cases the distance between the sampling points may lead to time-of-flight delays. Thus, for correlating the predominant audio component across audio streams the observation windows may need to be time-aligned (or sufficiently long enough). As the content consumer device 14 has information regarding the relative locations of the audio streams, the content consumer device 14 may determine the expected time-of-flight delays and time-align the observation windows accordingly.

In some examples, rather than treating the nearest audio stream differently, content consumer device 14 may determine an orthogonal $S_i$ for all audio streams (e.g., audio streams 170A-170C) and perform the vector interpolation, because, in some examples, some audio data may not be present in some audio streams due to noise and distance of the audio stream from the listener position 174. While determining an orthogonal $S_i$ for all audio streams may improve the robustness of the content consumer device 14, such aspects of the techniques described in this disclosure may also increase computational complexity. In some examples, the content consumer device 14 may only determine an orthogonal $S_i$ for audio streams with large eigenvalues. For example, content consumer device 14 may determine the eigenvalues of the audio streams via an eigenvalue decomposition. In some examples, the content consumer device 14 may place those audio streams with larger magnification at the listener position 174. In some examples, the content consumer device 14 may also perform band processing, such as processing in frequency bands, octaves or perform some other filter bank-based analysis for locating more audio sources. In some examples, the content consumer device 14 may determine a true delay with correlation.

Figure 6:
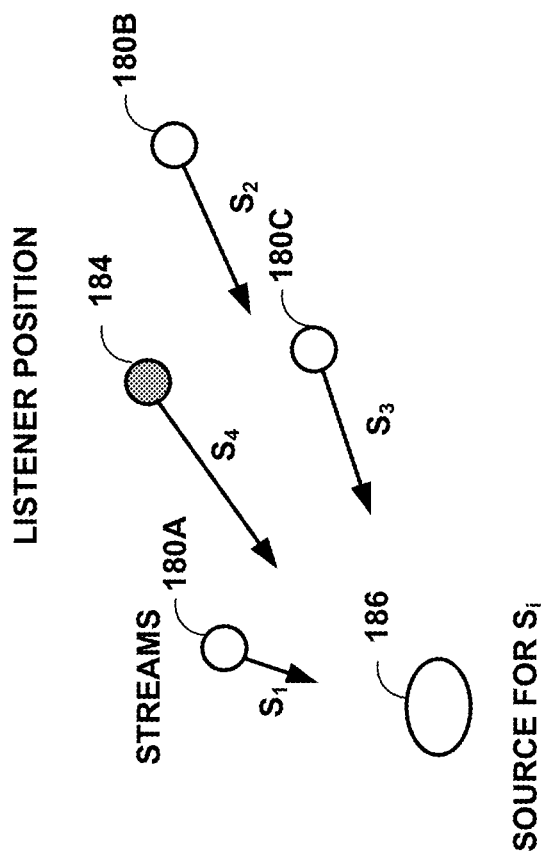
FIG. 6 is a conceptual diagram illustrating vector field interpolation according to the techniques of this disclosure.

FIG. 6 is a conceptual diagram illustrating vector field interpolation according to the techniques of this disclosure. For each $S_i$, the content consumer device 14 may form a vector field and then use vector field interpolation. In some examples, the content consumer device 14 may perform a line intersection technique, but a line intersection technique is more computationally expensive and may be unable to handle ambience sources because, when performing a line intersection technique with respect to the audio streams, an assumption is that the audio sources are point sources (e.g., located at a point). Additionally, a line intersection method may be unable to handle distributed audio sources. For example, there may be noise and lines may not intersect.

For example, directions $S_1$, $S_2$, an $S_3$ at the listener position 184 are unknown. The content consumer device 14 may use vector field interpolation to interpolate direction $S_4$ from directions $S_1$, $S_2$, and $S_3$. Audio source 186 is shown.

The audio source 186 may be a particular sound source, such as a voice. The audio streams 180A-180C may represent audio captured by microphones in locations represented by the locations of the audio streams 180A-180C or synthesized audio intended to be at the locations of the audio streams 180A-180C that may include audio from audio source 186. Content consumer device 14 may attempt to represent the audio source 186 at the location of the audio source 186 based on the audio streams 180A-180C.

Figure 7:
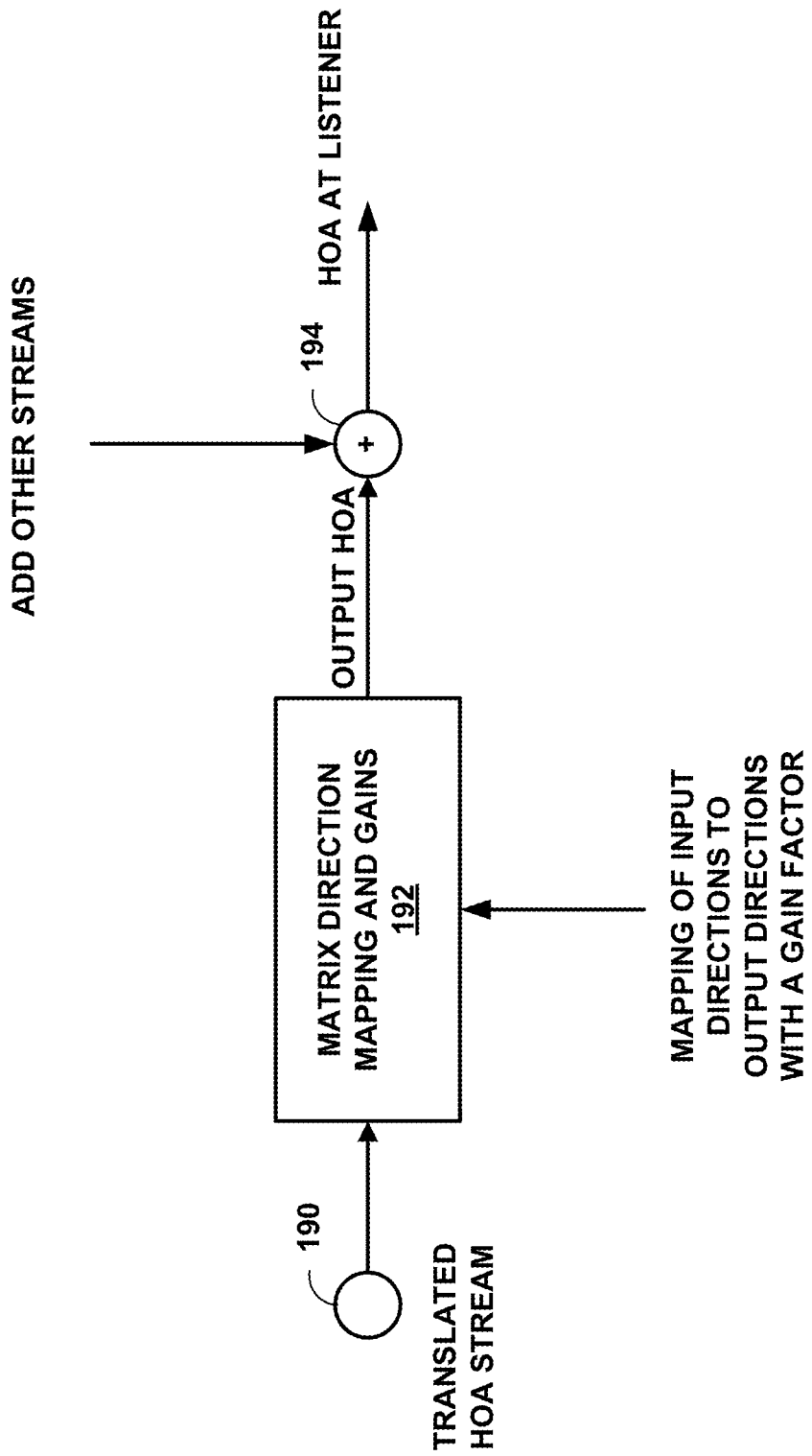
FIG. 7 is a conceptual diagram illustrating example beam warping techniques according to this disclosure.

FIG. 7 is a conceptual diagram illustrating example beam warping techniques according to this disclosure. The content consumer device 14 may apply matrix direction and mapping gains 192 to a translated HOA audio stream 190 (e.g., a plane wave translation). For example, the content consumer device 14 may beamform to an input direction (such as $S_1$ of FIG. 6) to determine the HOA at an output direction and may apply a gain. The content consumer device 14 may combine the output HOA with other output HOA audio streams with adder 194 and output an HOA soundfield at the listener position.

In some examples, the content consumer device 14 may utilize snapping to select a residual signal of the closest audio stream (the HOA soundfield minus the sound elements that are used for translation) and mix the residual with the final HOA soundfield. More information on snapping may be found in U.S. patent application Ser. No. 16/918,441, filed on Jul. 1, 2020 and claiming priority to U.S. Provisional Patent Application 62/870,573, filed on Jul. 3, 2020, and U.S. Provisional Patent Application 62/992,635, filed on Mar. 20, 2020. In some examples, there may be left over signals in the audio stream in the mapping due to uncorrelated ambience. The content consumer device 14 may add these left over signals back to the HOA stream without modification, for example, at the adder 194.

Figure 8:
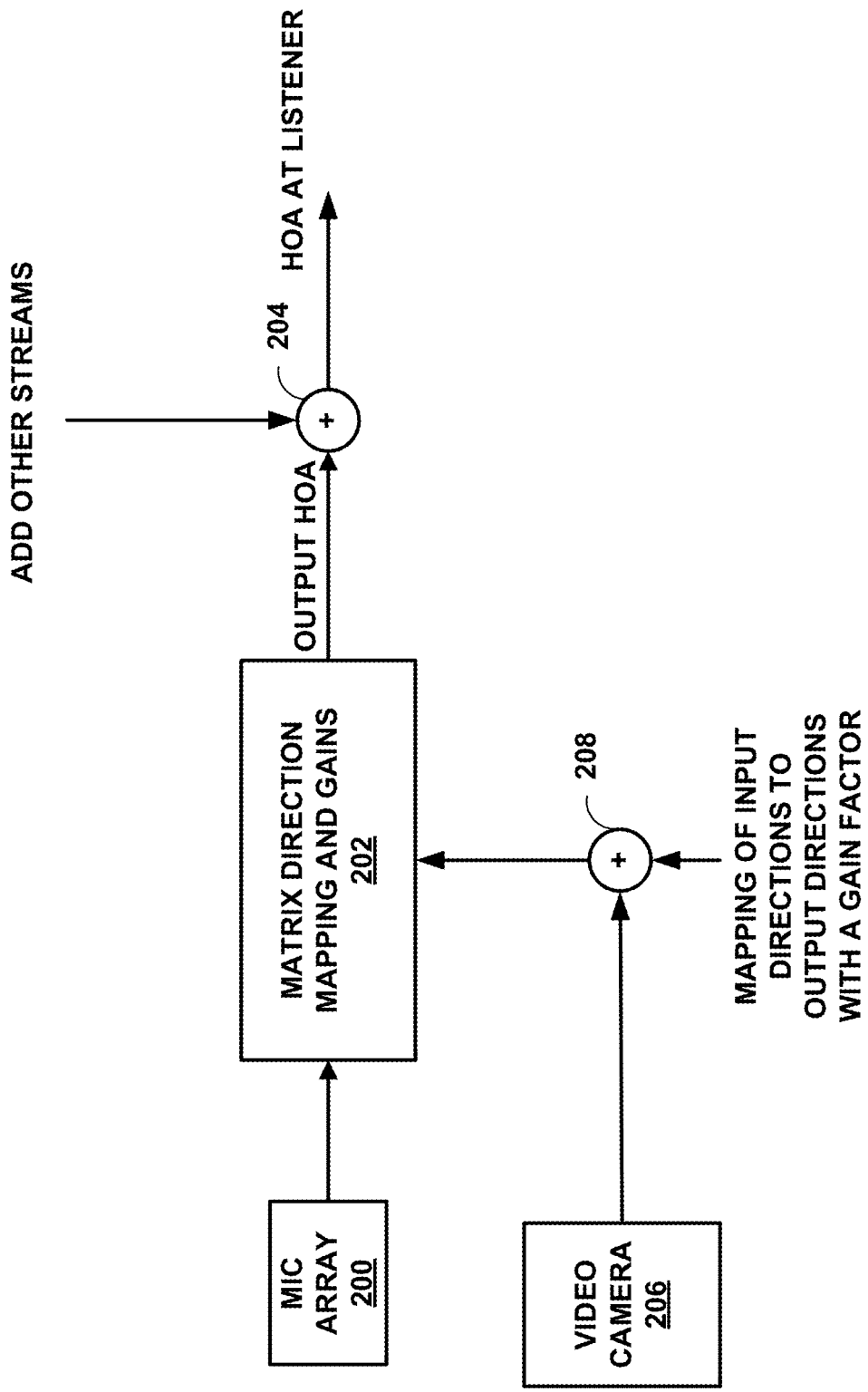
FIG. 8 is a conceptual diagram illustrating further example beam warping techniques according to this disclosure.

FIG. 8 is a conceptual diagram illustrating further example beam warping techniques according to this disclosure. In the example of FIG. 8, a microphone array 200 may capture audio data. In some examples, the microphone array 200 may capture audio data in multiple directions. The content consumer device 14 may use video captured by a video camera 206, which may be located near or at the location of the microphone array 200, and point cloud-based methods or object recognition techniques to determine input directions, such as $S_1$ of FIG. 6. In some examples, a separate device, such as a server may determine the input directions. In some examples, the source device 12 may determine the input directions. The content consumer device 14 may combine the input directions with a gain factor at an adder 208. The content consumer device 14 may apply matrix direction and mapping gains 202 to translated HOA audio streams from the microphone array 200 (e.g., plane wave translations). For example, the content consumer device 14 may beamform to an input direction (such as $S_1$ of FIG. 6) to determine the HOA at an output direction and may apply a gain. The content consumer device 14 may combine the output HOA with other output HOA audio streams with adder 204 and output an HOA soundfield at the listener position. In some examples, the content consumer device 14 may utilize snapping to select a residual signal of the closest audio stream (the HOA soundfield minus the sound elements that are used for translation) and mix the residual to the final HOA stream.

Figure 9A:
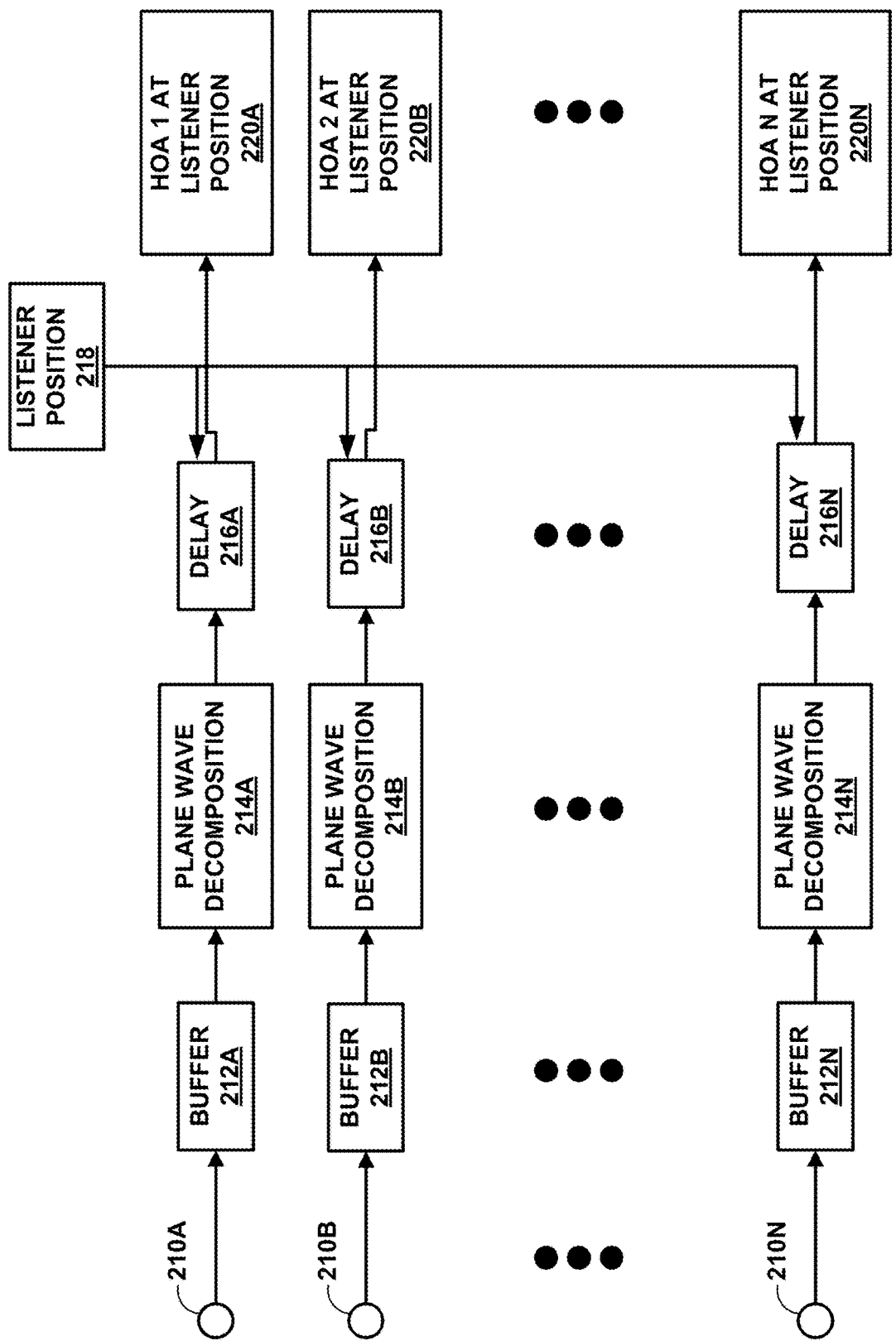
FIGS. 9A and 9B are functional block diagrams of a content consumer device according to the techniques of this disclosure.
Figure 9B:
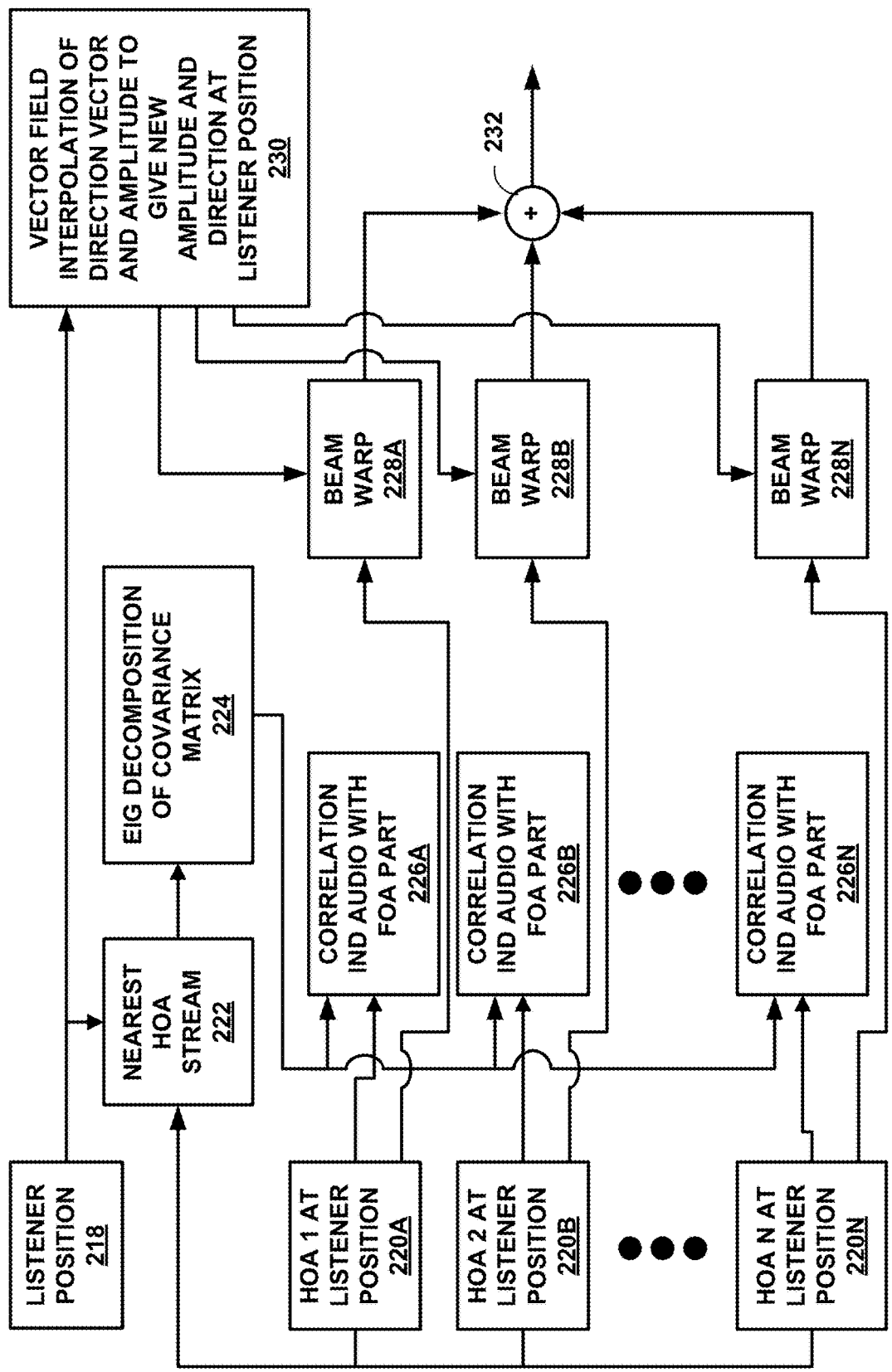

FIGS. 9A and 9B are functional block diagrams of a content consumer device according to the techniques of this disclosure. Audio streams 210A-210N are buffered in buffers 212A-212N, respectively. After buffering, each audio stream is plane wave decomposed by plane wave decomposers 214A-214N respectively. The listener position 218 may be known to the content consumer device 14. The content consumer device 14 may use the listener position 218 and location information for each of the audio streams 210A-210N (which may be included in metadata) to set a length of each of delays 216A-216N to an appropriate length. The length of the delays 216A-216N may vary based on the location information of the associated audio streams (e.g., the audio streams 210A-210N). After the delays 216A-216N, the aligned HOA signals (HOA 1 220A through HOA N 220N) for the listener position 218 may be derived.

In FIG. 9B, the content consumer device 14 may determine the nearest HOA stream 222 and generate an eigenvalue decomposition of covariance matrix 224 for the nearest HOA stream 222. The content consumer device 14 may use an eigenvalue decomposition of covariance matrix 224 and then correlate the individual audio components in the eigenvalue decomposition with the FOA part of the other HOAs at the listener position (e.g., correlations 226A-226N). The content consumer device 14 may also perform vector field interpolation of a direction vector and amplitude to create a new amplitude and direction 230 at the listener position 218. The content consumer device 14 may also apply beam warping (e.g., beam warps 228A-228N) to the HOA signals. The beam warped signals may be added together at adder 232 to create an HOA soundfield which the content consumer device 14 may render or send to a separate rendering device, such as wearable device 500 of FIG. 19, headphones 48 of FIG. 22B, or other rendering device.

Figure 10:
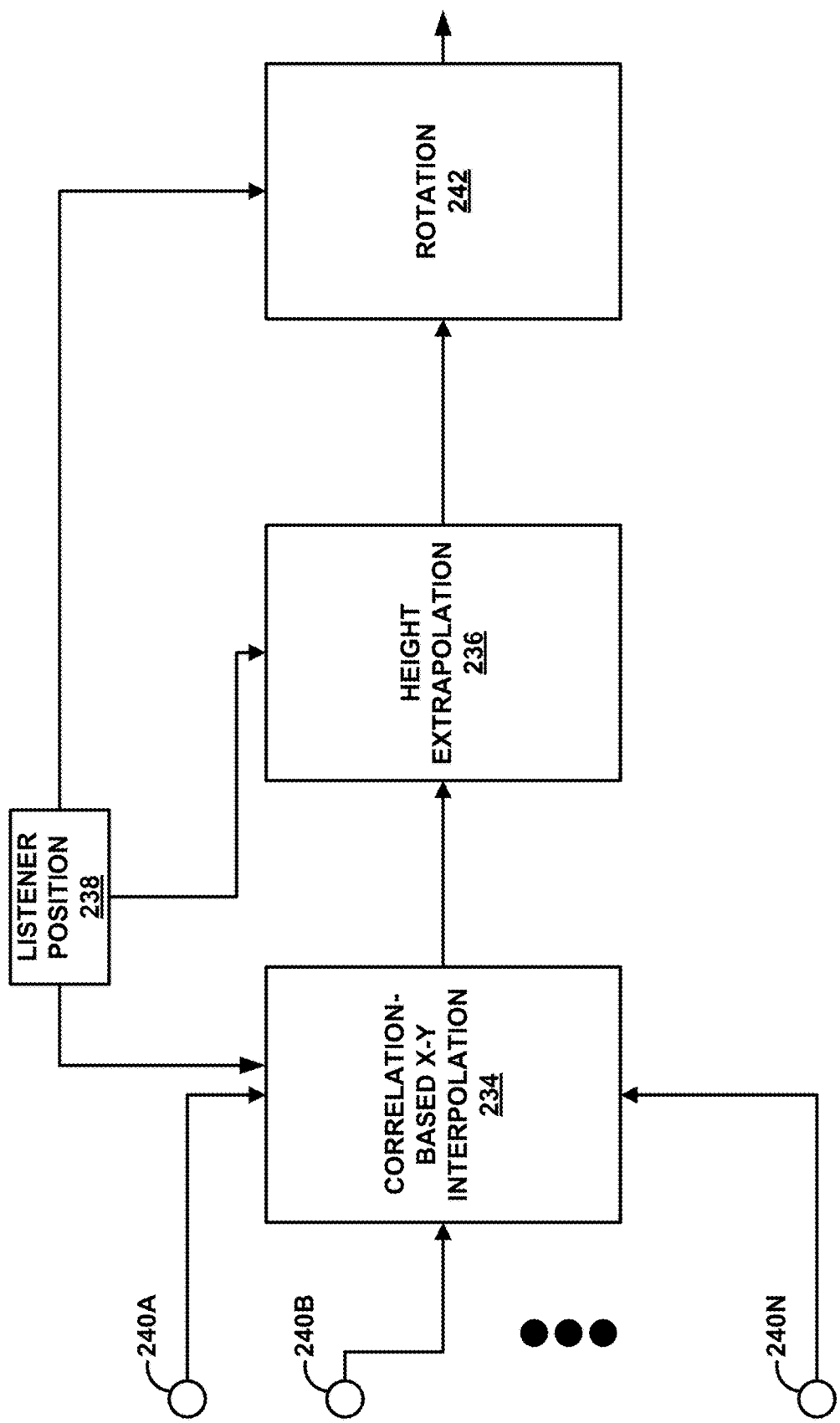
FIG. 10 is a conceptual diagram illustrating an example of using extrapolation to generate 6DoF ambisonics.

FIG. 10 is a conceptual diagram illustrating an example of using extrapolation to generate 6DoF ambisonics. For example, the content consumer device 14 may take audio streams 240A-240N and perform a correlation-based X-Y interpolation 234. For example, the content consumer device 14 may perform the interpolation techniques discussed herein for the X and Y coordinates for each of the audio streams 240A-240N to translate the audio streams to the listener position 238. In some examples, the content consumer device 14 may apply two dimensional HOA interpolation (e.g., left-right and front-back) between the sampling points and generate HOA_y1.

The content consumer device 14 may also perform a height extrapolation 236. For example, if a listener jumps into the air, an audio stream that may be at an angle of 45 degrees above the listener may be at 35 degrees above the listener when the listener reaches the pinnacle of their jump. The content consumer device 14 may use height extrapolation techniques to alter the soundfield even if the content consumer device 14 is not capable of otherwise handling a true 6DoF soundfield. For example, the content consumer device 14 may apply an HOA extrapolation algorithm to extrapolate HOA_y1 in height (e.g., up-down) within reasonable limits.

In some examples, the content consumer device may also perform rotation 242 of the height extrapolated signal for yaw, pitch, and/or roll. The content consumer device 14 may then render to soundfield to the listener.

The techniques of this disclosure may be used to render 6DoF audio with ambience, near field and distributed sources. Other audio effects are possible according to the techniques of this disclosure. For example, the content consumer device 14 may separate out audio sources in a region(s) that a listener can interactively specify or which may be specified in a bit stream by source device 12 from which the listener may select (e.g., for an MPEG-I format).

The content consumer device 14 may attenuate, magnify or remove audio sources in different regions, move regions (groups of audio sources together), rotate regions, overlap regions, etc. The content consumer device 14 may remove reverb which are far field components from the audio sources and/or add custom reverb to the near field audio sources. In some examples, the content consumer device 14 may apply line intersection instead of vector interpolation for audio source localization. The content consumer device 14 may zoom in on one or multiple audio sources.

The content consumer device 14 may move a single audio source or multiple audio sources while keeping other audio sources intact. The content consumer device 14 may stretch out a distance between two audio sources or manipulate positions of audio sources such as by stretching, contracting, or focusing the audio source. The content consumer device 14 may remove, attenuate, or keep ambience audio sources or distributed sources. The ambient audio sources may be audio sources that have high variance in localization. The content consumer device 14 may or keep, magnify, attenuate, or remove point audio sources. The content consumer device 14 may make a point audio source distributed over a region as an overlay and take distributed sources over a region and make them a point audio source.

Content consumer device 14 may keep certain audio sources for AR and put the kept audio sources at locations interactively (e.g., selected by the listener) or keep their relative orientations as given by interpolation. The content consumer device 14 may add speech denoising after extracting audio sources to enhance the speech components within the audio sources. The content consumer device 14 may replace audio source components. For example, the content consumer device 14 may replace a voice of one person with that of another person in an AR scenario or otherwise. The content consumer device 14 may swap or assign audio data to different sources interactively (e.g., selected by the listener) or specified by source device 12.

Figure 11:
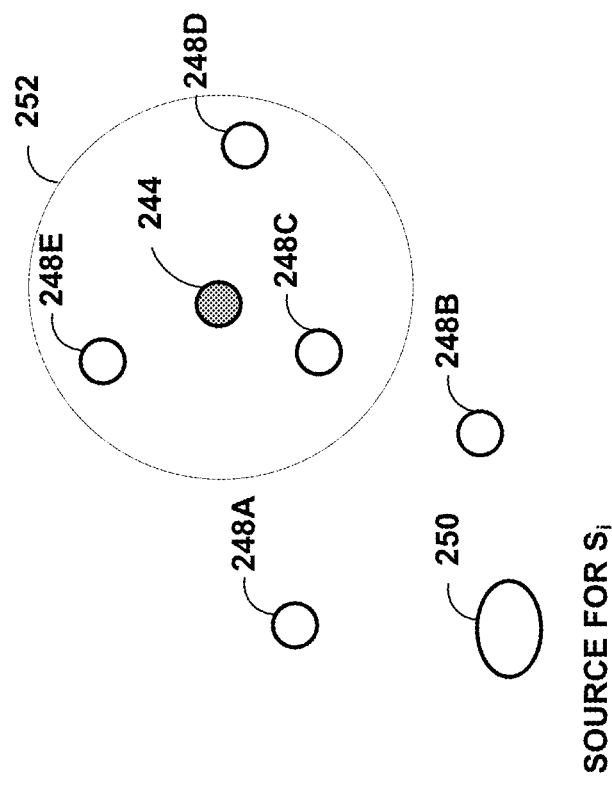
FIG. 11 is a conceptual diagram illustrating an example of correlation techniques of this disclosure.

FIG. 11 is a conceptual diagram illustrating an example of correlation techniques of this disclosure. In some examples, rather than perform the correlation techniques discussed herein for all audio streams, content consumer device may selectively perform the correlation techniques for a nearest number of audio streams. For example, in FIG. 11, listener position 244 is shown. The nearest audio streams are audio streams 248C-248E. Audio streams 248A and 248B are further away from the listener position 244 than the audio streams 248C-248E and are closer to audio source 250. As such, in this example, the content consumer device 14 may only perform the correlation techniques on those audio streams shown inside area 252. In this example, the content consumer device 14 may select N (which may be any positive integer number) closest audio streams (e.g., audio streams 248C-248E) to improve the accuracy of the audio soundfield (nearer audio streams may have a greater influence on the listener) and reduce the computational complexity of the content consumer device 14. In some examples, content consumer device 14 may take the angular separation between the audio streams into consideration when choosing the audio streams to perform the techniques on.

Figure 12:
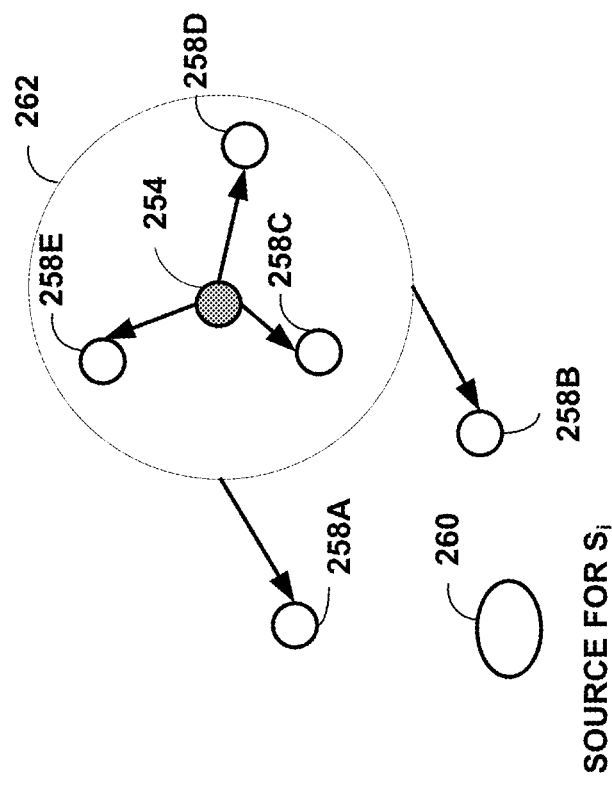
FIG. 12 is a conceptual diagram of hierarchical correlation techniques according to this disclosure.

FIG. 12 is a conceptual diagram of hierarchical correlation techniques according to this disclosure. In some examples, the content consumer device 14 may use hierarchical correlation techniques. For example, the content consumer device 14 may utilize different order ambisonics based on how near a given audio stream is to the listener position 254. For example, the content consumer device 14 may generate $4^{th}$ order ambisonics for the nearest audio stream 258C to the listener position 254. The content consumer device 14 may generate $3^{rd}$ order ambisonics or $2^{nd}$ order ambisonics for the next 2 nearest audio streams (e.g., audio streams 258D and 258E) and FOA for the remaining audio streams 258A and 258B which are shown outside of circle 262 and closer to audio source 260. These numbers are provided as examples and other numbers may be used. In this example, the correlation order resolution decreases as the audio stream positions are further away from the listener position 254. In some examples, a predetermined threshold may be set to define the boundary beyond which correlation is purely with FOA audio streams.

In some examples, the techniques of this disclosure may be used with a mono stream scenario. Content may have mono audio streams, such as audio streams captured by spot mics, which should be included in the vector field interpolation. The mono audio streams may lack a directional vector so the content consumer device 14 may impart one when including that mono audio source in the vector field interpolation. In one example, the content consumer device 14 may interpolate to the position of the mono audio source using the nearest vector streams to the mono audio source. In another example, the content consumer device 14 may interpolate to the position of the mono source using the nearest vector streams to the listener position.

Figure 13:
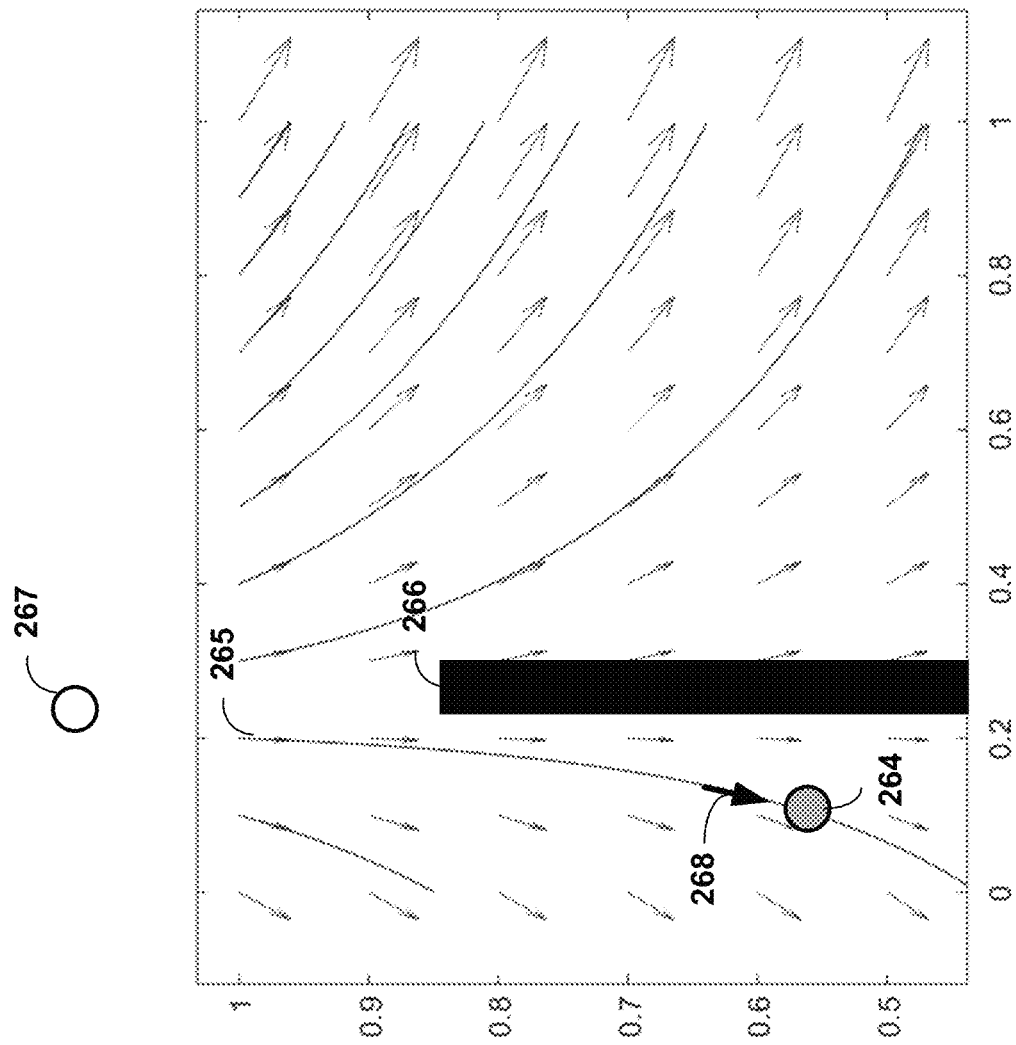
FIG. 13 is a conceptual diagram illustrating example mono stream techniques of this disclosure.

FIG. 13 is a conceptual diagram illustrating example mono stream techniques of this disclosure. For example, the content consumer device 14 may calculate the flow line 265 from the mono audio source to the listener position 264, where flow line is a path c(t) such that: c'(t)=F(c(t)). For example, the content consumer device 14 may determine flow lines from mono audio source 267 as depicted in FIG. 13. An occlusion element 266 (such as an object) may occlude some of the flow lines. The content consumer device 14 may impart vector 268 with the direction of the flow path to the mono audio source 267 at the listener position 264. In this example, flow lines may account for any acoustic elements in the scene whereas local interpolation using other techniques may not. More information on calculating the flow line may be found in Marsden, Jerrold E., and Anthony Tromba, *Vector Calculus*, Macmillan, 2003.

Figure 14:
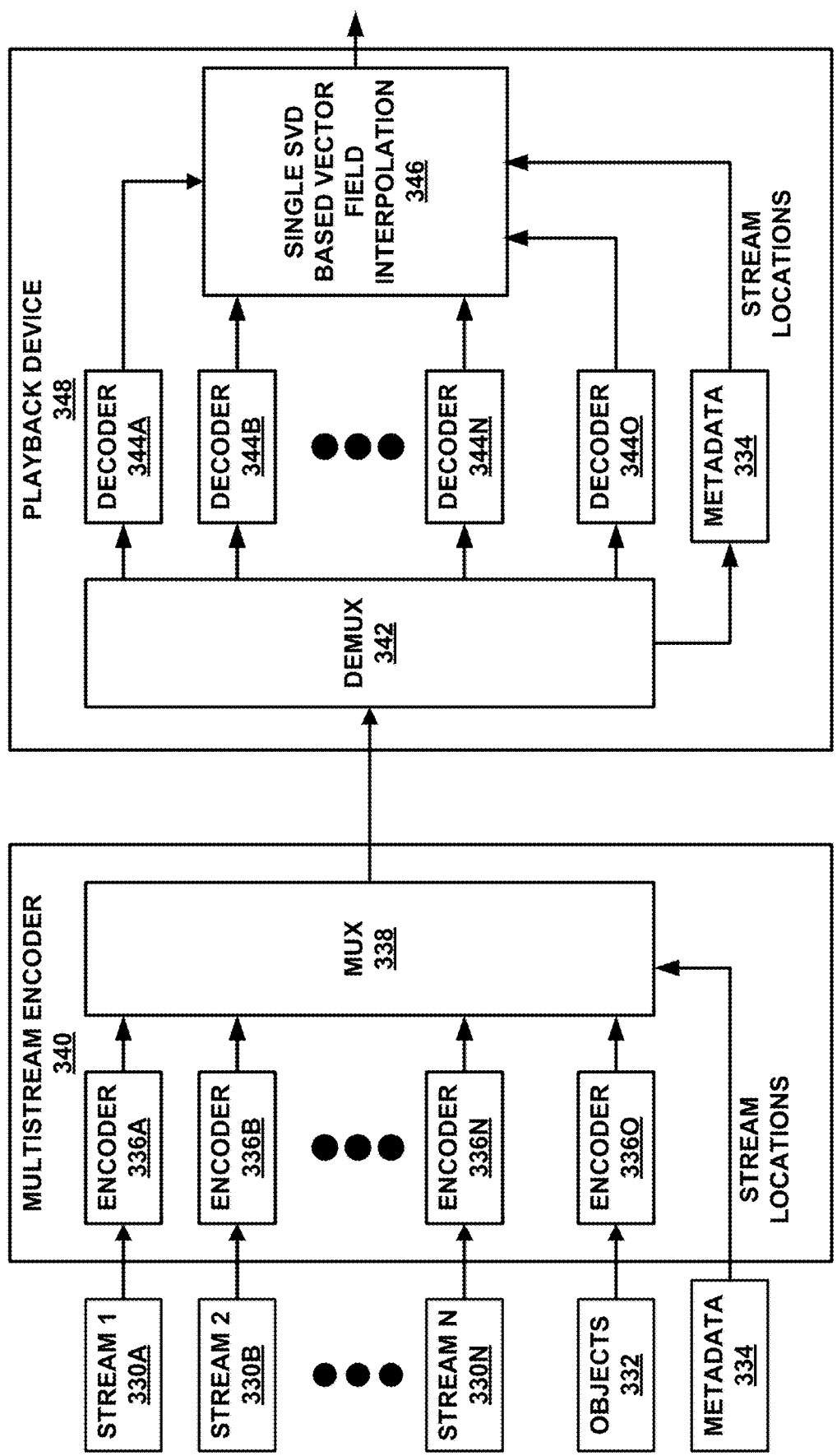
FIG. 14 is a block diagram of a system that may perform various aspects of the techniques described in this disclosure.

FIG. 14 is a block diagram of a system that may perform various aspects of the techniques described in this disclosure. The system of FIG. 14 includes a multistream encoder 340 and a playback device 348. The multistream encoder 340 may be an example of the source device 12 and playback device 348 may be an example of the content consumer device 14. Audio streams 330A-330N and audio objects 332 may represent audio captured by microphones at one or more locations or synthesized audio generated by a computing device and intended to be at one or more locations. Metadata 334 may include location information identifying the location of audio streams 330A-330N and/or audio objects 332. Each of the audio streams 330A-330F and the audio objects 332 may be encoded by a respective encoder 336A-336O. A multiplexer, mux 338 may multiplex the encoded audio streams, the encoded audio objects, and the metadata 334 together. The multiplexed signal may be sent via a bitstream to the playback device 34B. A demultiplexer, demux 342 may demultiplex the multiplexed signal. Decoders 344A-344O may decode the demultiplexed audio signals to recreate the audio streams 330A-330N and the audio objects 332. A demux 342 may also demultiplex the metadata 334, which may include the location of the audio streams 330A-330N and audio objects 332. Single SVD based vector field interpolation 346 may apply a single SVD based vector field interpolation to the decoded audio streams and decoded audio objects to generate an audio soundfield which may be rendered to a user or output to another device for rendering.

In the example of FIG. 14, each of audio streams 330A-330N may include a PCM audio stream that was captured by a device that includes 1 or more microphones. In some examples, audio objects may be sent with associated metadata, e.g. if there is a music stream or some media that is encoded in an object format. In some examples, the mux 338 is an MPEG-I multiplexer. The mux 338 may add 6DoF metadata (e.g., in the metadata 334) to a bitstream for output to the playback device 348. In some examples, rather than there being a mux 338 in the multistream encoder 340, there may be a multiplexer associated with each of encoders 336A-336O that may multiplex the audio data with the 6DoF metadata such as separate encoding devices each having their own mux. In some examples, the mux 338 may be in a separate device (such as a server, a virtual assistant, a computing device, etc.) from the multistream encoder 340. In some examples, the mux 338 may aggregate all of the individual metadata associated with each audio stream.

In some examples, the playback device 348 may apply the SVD-based vector field interpolation on a matrix created by stacking all the audio streams. In these examples, the audio scene and audio sources may not change within a large audio frame.

In some examples, the audio streams 330A-330N may be in a compressed ambisonic stream format. In this scenario, the SVD may be applied by multistream encoder 340 prior to encoding rather than on playback device 348.

In MPEG-H, a V-vector is a multidimensional vector that points to all of the audio sources in the soundfield at the same time. In some examples, the output of the decoders 344A—344O are ambisonic coefficients. For example, the playback device 348 may create a number O (not zero) sets of ambisonic coefficients, one for each audio stream or audio object. Additionally, there may be a metadata channel associated with each decoder and the metadata channel may include a V-vector. So, in the example of FIG. 14 there may be O (not zero) sets of ambisonic coefficients and O (not zero) V-vectors.

Figure 15:
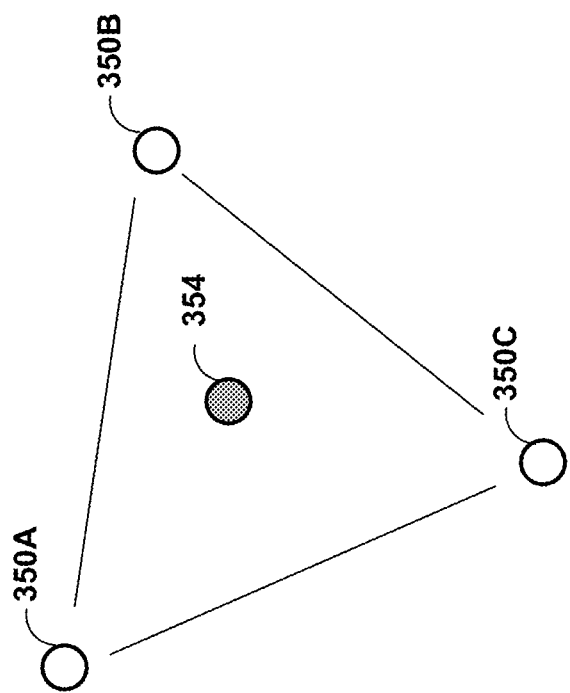
FIG. 15 is a conceptual diagram illustrating an example of audio streams before wave field interpolation.

FIG. 15 is a conceptual diagram illustrating an example of audio streams before wave field interpolation. FIG. 15 shows audio stream 350A, audio stream 350B, audio stream 350C and listener position 354. Each audio stream has a location associated with the audio stream.

Figure 16:
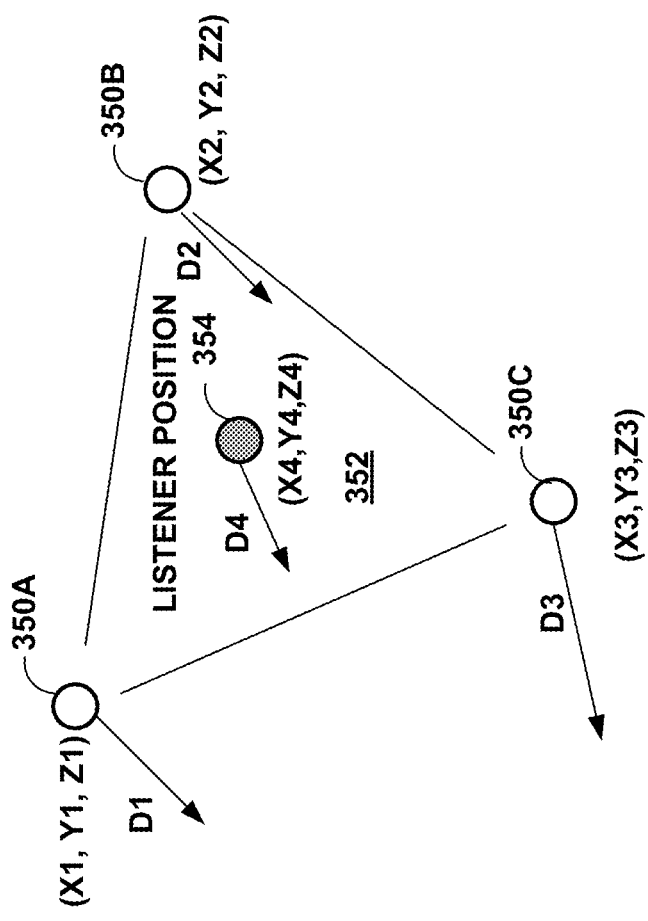
FIG. 16 is a conceptual diagram illustrating an example of audio streams with the determined vector fields.

FIG. 16 is a conceptual diagram illustrating an example of audio streams with the determined vector fields. Each location, such as the locations of the audio streams 350A-350C and the listener position 354 includes x, y, and z directional components to represent a 3D direction vector with the length of the vector representing the amplitude of audio stream at the specified coordinate (x,y,z). For example, $$D(x, y, z) = \begin{bmatrix} d_x \\ d_y \\ d_z \end{bmatrix} = ax + by + cz + d,$$

may be the direction vector which is a linear vector field. In this example, a, b, c, d are 3*1 vectors.

Given D1, D2 and D3 at locations (x1, y1, z1), (x2, y2, z2) and (x3, y3, z3), respectively find D4 (direction vector) at location (x4, y4, z4) located within the area 352 (triangle) enclosed by the locations of audio streams 350A-350C.

Interpolating within the area 352 produces stable results, however interpolation outside of the area 352 is also possible.

Playback device 348 may formulate a least squares problem as follows:

$$\text{minimize}_A \left\| \underbrace{[D_1 \ D_2 \ D_3 \ \cdots]}_{D} - \underbrace{\begin{bmatrix} | & | & | & | \\ a & b & c & d \\ | & | & | & | \end{bmatrix}}_{A} \underbrace{\begin{bmatrix} x1 & x2 & x3 & \cdots \\ y1 & y2 & y3 & \cdots \\ z1 & z2 & z3 & \cdots \\ 1 & 1 & 1 & \cdots \end{bmatrix}}_{X} \right\|_2$$

With the solution as $A=DX^\dagger$ with $(\ )^\dagger$ representing the pseudo-inverse of a matrix. To find a D at listener position, playback device 348 may calculate $$D = A \begin{pmatrix} x \\ y \\ z \\ 1 \end{pmatrix}.$$

The playback device 348 may start with a point source scenario, where an audio source is located at coordinates (sx, sy, sz). The playback device 348 may determine a vector field according to $$D(x, y, z) = \begin{pmatrix} x - sx \\ y - sy \\ z - sz \end{pmatrix},$$

with vector pointing towards the audio source and the length of the vector denotes the distance to the audio source. The length increases with distance, but for sound, the amplitude (the root mean square (rms) of the sum of square) is inversely proportional to the distance with the amplitude being infinite at the audio source location. However, this infinity may be unstable for the solution to the least squares problem especially when there is noise present in the captured sound. Therefore, the playback device 348 may find the normal direction vector from the first order components of the audio source and set the length to an inverse of the root mean square (rms) energy of the audio source. Then $$D(x, y, z) = \begin{pmatrix} x - sx \\ y - sy \\ z - sy \end{pmatrix}$$

$$= \frac{1}{\text{rms energy of audio frame}} \begin{pmatrix} X/W \\ Y/W \\ Z/W \end{pmatrix} * \frac{1}{\left\| \begin{pmatrix} X/W \\ Y/W \\ Z/W \end{pmatrix} \right\|_2}$$

In the above formula, W, X, Y and Z are the first order components. Given D(x, y, z) at several different capture positions (such as the locations of audio streams 350A-350C, the playback device 348 may estimate using the previous least squares formulation a D(x, y, z) at the listener position 354. In this case, the playback device 348 may ensure that a single audio source is present or use SVD and correspondence between the V-vectors to separate out the audio sources and then apply vector field interpolation to estimate D(x, y, z). This formulation may be robust for distributed audio sources and ambient sources where a specific source location is not present, in this case the matrix A may not be approximately diagonal in the first three columns. This property can be used to separate out distinct point sources from the ambience or largely distributed audio sources.

For example, the playback device 348 may receive a bitstream and determine the location of the audio streams, such as audio streams 350A-350C. The playback device 348 may determine parameters (a, b, c and, d) for each audio stream. The playback device 348 may utilize a parameter matrix A and for a location that does not have a source, e.g. the listener position 354, the directional vector at that listener position can be determined (D4). The playback device 348 may convert the directional vector D4 from cartesian coordinates into spherical coordinates. From the spherical coordinates, playback device 348 may determine ambisonic coefficients (1st order, e.g., 4 coefficients, C0, C1, C2, C3, which can also be denoted as X, Y, Z, and W) or also described as first order ambisonic (FOA) channels. In some examples, playback device 348 may send the parameter matrix A to a separate rendering device, such as wearable device 500, headphones 48, or other rendering device. In such instances, the separate rendering device may use the parameter matrix A to render the soundfield.

For example, playback device 348 may obtain the direction vectors from the first order components or parts of HOA streams. From the known direction vector, the playback device 348 may estimate the direction vector at the listener position 354 by finding matrix A. The playback device 348 may convert the direction vector to a certain order ambisonics assuming plane waves. The playback device 348 may exchange these ambisonics in place of V1, V2, V3 and V4. In this example, W, X, Y and Z are first order coefficients of the V vector, e.g., X1(1) is the X component of V-Vector 1 for audio stream 1 (e.g., audio stream 350A).

From audio stream 1

$d1(1)x=(X1(1)/W1(1))$/rms energy of audio frame $d1(1)y=(Y1(1)/W1(1))$/rms energy of audio frame $d1(1)z=(Z1(1)/W1(1))$/rms energy of audio frame From audio stream 2

$d1(2)x=(X1(2)/W1(2))$/rms energy of audio frame $d1(2)y=(Y1(2)/W1(2))$/rms energy of audio frame $d1(2)z=(Z1(2)/W1(2))$/rms energy of audio frame From audio stream 3

$d1(3)x=(X1(3)/W1(3))$/rms energy of audio frame $d1(3)y=(Y1(3)/W1(3))$/rms energy of audio frame $d1(3)z=(Z1(3)/W1(3))$/rms energy of audio frame

[FIND D4 (for V-vector1)]
From audio stream 1 [D2]

$d1(1)x=(X2(1)/W2(1))$/rms energy of audio frame $d1(1)y=(Y2/W1)$/rms energy of audio frame $d1(1)z=(Z2/W1)$/rms energy of audio frame

[FIND D4 (for V-vector2)]

$D4(V1), D4(V2), D4(V3)$

D4 is a direction component and playback device 348 can find the angles theta and phi. Playback device 348 may assume a plane wave and, based on ambisonic order, convert to any order D4'.

D4 (of n+1) where n+1 is any order having 3 ambisonic components.

For example, in place of V1, the playback device 348 may exchange D4 (1) to obtain the direction of the audio source pointed to by D4. In place of V2, the playback device 348 may exchange D4 (2) to obtain the direction of the audio source pointed to by D4. In place of V3, the playback device 348 may exchange D4 (3) to obtain the direction of the audio source pointed to by D4. Playback device 348 may add the streams together and render the audio scene.

For non-ambisonics, the playback device 348 may have a location of sources or objects (sx, sy, sz) and may determine matrix A by assuming that the hyperplane is $dx1=x1-sx$ $dy1=y1-sy$ $dz1=z1-sz$ $dx4=x4-sx$ $dy4=y4-sy$ $dz4=z4-sz$ This yields that a1, b1, c1 are [identity matrix as shown below]

$$A = \begin{bmatrix} (1, 0, 0) - sx \\ (0, 1, 0) - sy \\ (0, 0, 1) - sz \end{bmatrix}$$

In some examples, multistream encoder 340 may insert a flag into the bitstream that playback device 348 may receive. This flag may denote whether audio data is an audio object or an ambisonics stream. In some examples, playback device, depending on the value of the flag, determines whether D4 is in the cartesian coordinate domain or the ambisonics domain.

Figure 17:
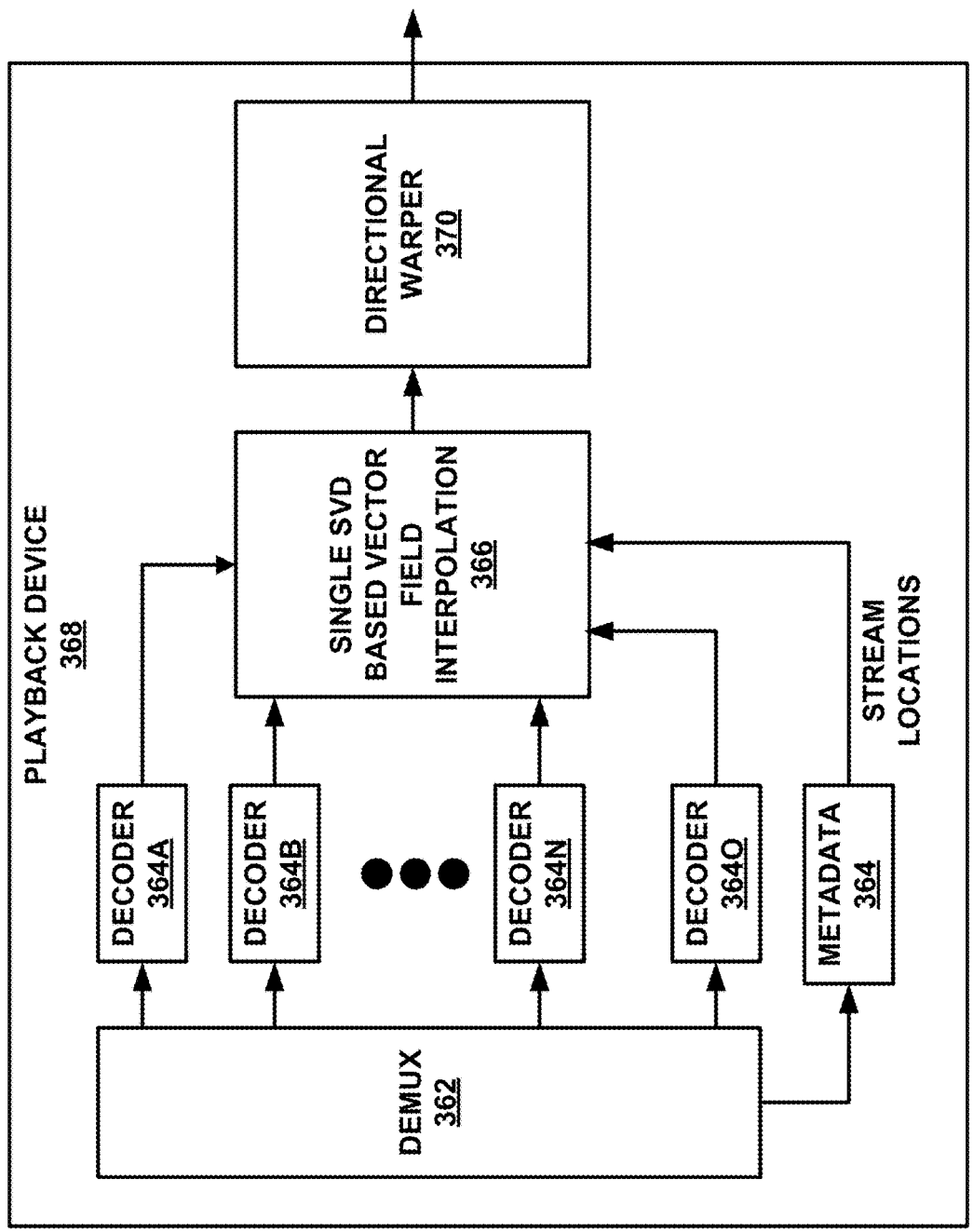
FIG. 17 is a functional block diagram of an example playback device according to the techniques of this disclosure.

FIG. 17 is a functional block diagram of an example playback device according to the techniques of this disclosure. The playback device 368 is similar to the playback device 348 of FIG. 14, however, the playback device 368 includes a directional warper 370. A demux 362 may demultiplex a multiplexed signal. Decoders 364A-364O may decode the demultiplexed audio signals to recreate audio streams and audio objects. The demux 362 may also demultiplex metadata 364, which may include the location of the audio streams and audio objects. Single SVD based vector field interpolation 366 may apply a single SVD based vector field interpolation to the decoded audio streams and decoded audio objects. The directional warper 370 may then warp the directions generated by the single SVD based vector field interpolation 366. The directional warper 370 may generate an audio soundfield which may be rendered to a user or output to another device for rendering.

In some examples, playback device 368 may apply the directional warper 370 to D4 of FIG. 16. The directional warper 370 may take the following pairs (D1 and D4), (D2 and D4), and (D3 and D4). For example, the directional warper may find D41 for the V-vector D1 of audio stream 350A, D42 for the V-vector D2 of audio stream 350B, and D43 for V-vector D3 of audio stream 350C 3. The playback device 368 may convert back the V-vectors and rotation information from the determined D4 to any ambisonic order.

Figure 18:
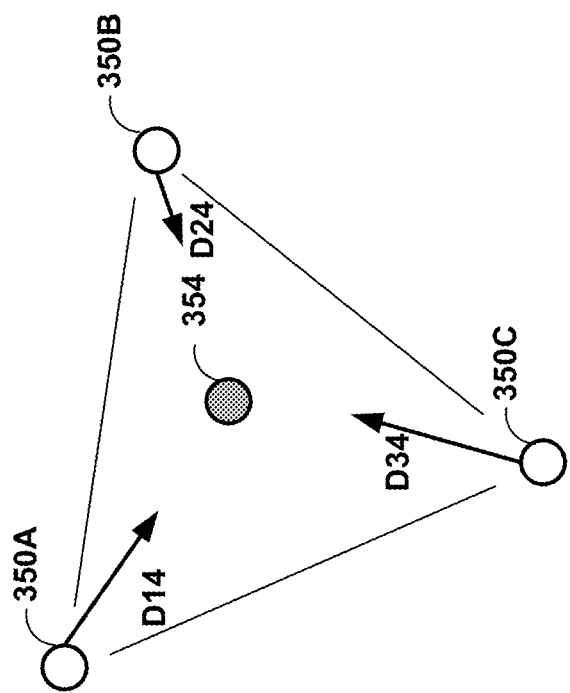
FIG. 18 is a conceptual diagram illustrating direction warping techniques of this disclosure.

FIG. 18 is a conceptual diagram illustrating direction warping techniques of this disclosure. After direction warping, the V-vector D14 of the audio stream 350A, the V-vector D24 of the audio stream 350B, and the V-vector D34 of the audio stream 350C now point towards the listener position 354.

The techniques of this disclosure may be used to efficiently represent a soundfield for rendering once a listener moves. In some examples, rather than determine the soundfield at the playback device 348, the playback device may determine the parameter matrix A and send the parameter matrix A and audio data (e.g., coefficients) to a separate rendering device and the rendering device may determine the soundfield based on the parameter matrix A. For example, the rendering device may determine the soundfield by multiplying the parameter matrix A by the location of the listener position.

That allows you to represent the entire soundfield in a compact way, so that changing the listener position you can determine the direction vectors of the sources as if they were coming to the listener.

In the example where the playback device 348 is not rendering the soundfield, but is instead sending information to a separate rendering device, the rendering device may not need to send the listener location to the playback device 348. Instead, the playback device 348 may just send parameter matrix A to the rendering device and the rendering device may determine D4 using the parameter matrix A as described above.

For example, the playback device 348 may send audio data and parameter matrix A. In this case, when the listener position changes again, the playback device 348 may recalculate the parameter matrix A and send the updated parameter matrix A to the rendering device. When determining parameter matrix A, the playback device 348 essentially fits a hyperplane for direction vectors of a soundfield. This allows for the representation of the entire soundfield in a compact manner. When the listener position changes, the playback device 348 or rendering device determines the direction vectors of the audio streams as if they were coming to the listener.

Figure 19:
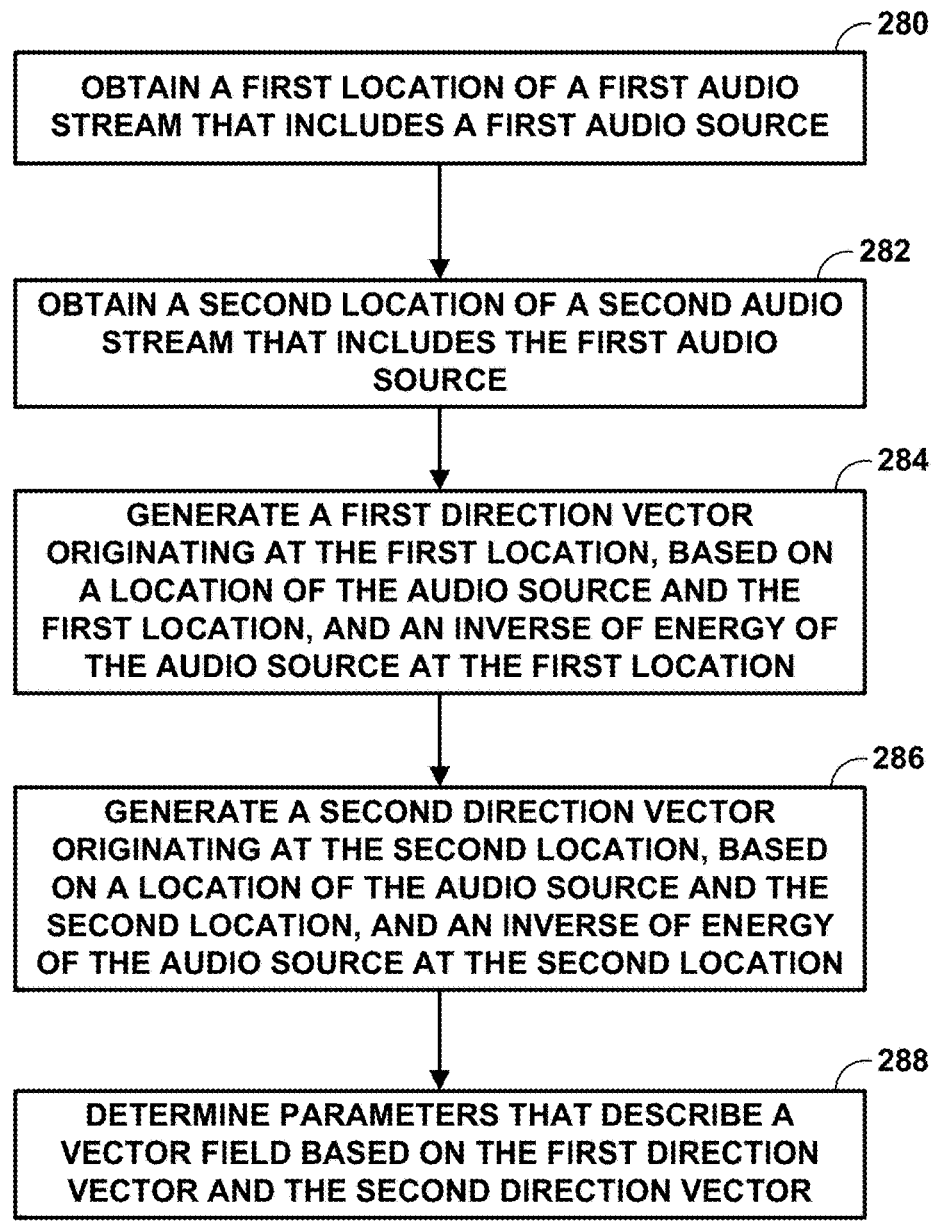
FIG. 19 is a flowchart illustrating example vector field interpolation techniques of this disclosure.

FIG. 19 is a flowchart illustrating example vector field interpolation techniques of this disclosure. The content consumer device 14 may obtain a first location of a first audio stream that includes an audio source (280). For example, the content consumer device 14 may receive location data associated with the first audio stream. The location data may include an X, Y and/or Z coordinate and may be relative to the audio source. The content consumer device 14 may obtain a second location of a second audio stream that includes the audio source (282). For example, the content consumer device 14 may receive location data associated with the second audio stream. The location data may include an X, Y and/or Z coordinate and may be relative to the audio source.

The content consumer device 14 may generate a first direction vector originating at the first location, based on a location of the audio source and the first location, and an inverse based on an energy of the audio source at the first location (284). For example, the content consumer device 14 may generate a vector pointing from the first location towards the audio source with a length being inversely proportional to the energy of the audio source at the first location.

The content consumer device 14 may generate a second direction vector originating at the second location, based on a location of the audio source and the second location, and an inverse based on an energy of the audio source at the second location (286). For example, the content consumer device 14 may generate a vector pointing from the second location towards the audio source with a length being inversely proportional to the energy of the audio source at the second location.

The content consumer device 14 may determine parameters that describe a vector field based on the first direction vector and the second direction vector (288). For example, the content consumer device 14 may perform a regression or least means square of the first direction vector and the second direction vector. For example, the content consumer device 14 may determine a plane wave translation of the first audio stream and the second audio stream, determine a covariance and a linear invertible transform for one of the plane wave translated audio streams, and correlate first order components of other of the plane wave translated audio stream with the covariance and linear invertible transform for the one of the plane wave translated audio streams. In some examples, the linear invertible transform is a singular value decomposition.

In some examples, the content consumer device 14 may render an audio soundfield based on the parameters. In some examples, the content consumer device 14 may transmit the parameters to a separate rendering device. For example, the content consumer device 14 may transmit a parameter matrix [A] to a wearable device, such as wearable device 500. In some examples, the content consumer device 14 may be a mobile handset. In some examples, the content consumer device 14 is a virtual assistant. In some examples, the source device 12 is a mobile handset. In some examples, the source device 12 is a virtual assistant. In other words, the techniques of this disclosure may be performed by a mobile handset or a virtual assistant.

In some examples, audio data is encoded audio data and the content consumer device 14 may demultiplex the encoded audio data and location data from a bitstream 27 and may decode the encoded audio data associated with the first audio stream and the second audio stream to determine decoded audio data. In some examples, content consumer device 14 may include a demultiplexer configured to demultiplex the encoded audio data and the location data from a bitstream.

In some examples, the source device 12 may encode the audio data associated with the first audio stream and the second audio stream to determine encoded audio data. In some examples, the source device 12 includes a multiplexer configured to multiplex the encoded audio data and the location data into the bitstream 27.

In some examples, at least one of the first audio stream and the second audio stream is an ambisonic stream. In some examples, at least one of the first audio stream and the second audio stream is an audio object. In some examples, at least one of the first audio stream and the second audio stream is a single-channel audio stream (e.g., a mono stream, such as from a spot microphone).

In some examples, the content consumer device 14 may determine a nearest audio stream of the plane wave translated audio streams to a listener position. In some examples, the one of the plane wave translated audio streams is the nearest audio stream.

In some examples, the content consumer device 14 may determine a respective delay for each of the plane wave translated audio streams and apply the respective delay to each of the plane wave translated audio streams. In some examples, the content consumer device 14 may convert the plane wave translated audio streams to ambisonic audio streams at the listener position. In some examples, the content consumer device 14 may beam warp the ambisonic audio streams at the listener position. In some examples, the content consumer device may beam warp the first audio stream and the second audio stream at a listener position. In some examples, the content consumer device 14 may extrapolate a height based on the parameters.

Figure 20:
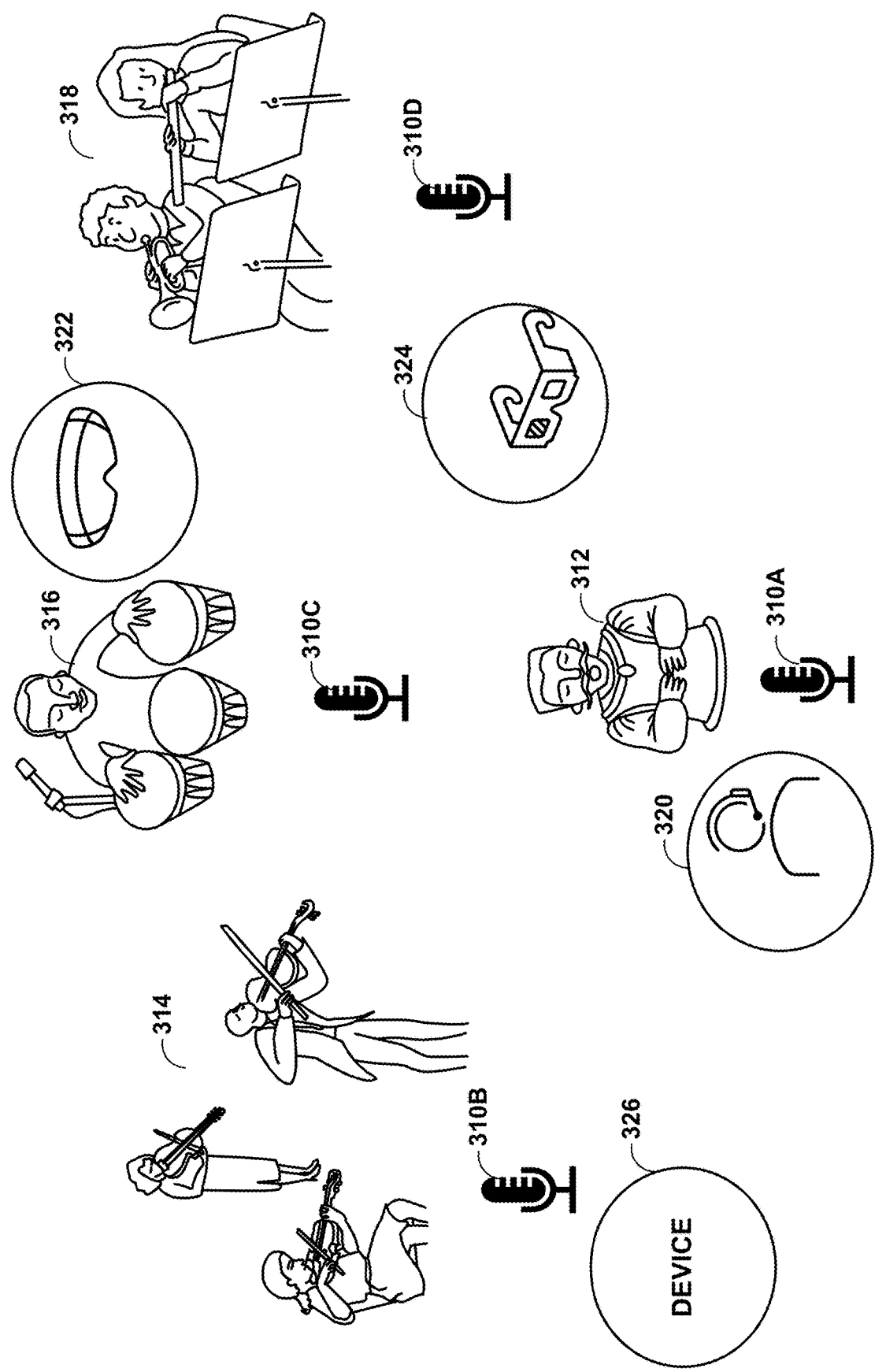
FIG. 20 is a conceptual diagram illustrating an example concert with three or more audio streams.

FIG. 20 is a conceptual diagram illustrating an example concert with three or more audio streams. In the example of FIG. 20, a number of musicians are depicted on stage 323. Singer 312 is positioned behind microphone 310A. A string section 314 is depicted behind microphone 310B. Drummer 316 is depicted behind microphone 310C. Other musicians 318 are depicted behind microphone 310D. Microphones 310A-301D may capture audio streams that correspond to the sounds received by the microphones. In some examples, microphones 310A-310D may represent synthesized audio streams. For example, microphone 310A may capture an audio stream(s) primarily associated with singer 312, but the audio stream(s) may also include sounds produced by other band members, such as the string section 314, the drummer 316 or the other musicians 318, while the microphone 310B may capture an audio stream(s) primarily associated with string section 314, but include sounds produced by other band members. In this manner, each of microphones 310A-310D, may capture a different audio stream(s).

Also depicted are a number of devices. These devices represent user devices located at a number of different desired listening positions. Headphones 320 are positioned near microphone 310A, but between microphone 310A and microphone 310B. As such, according to the techniques of this disclosure, content consumer device 14 may select at least one of the audio streams to produce an audio experience for the user of the headphones 320 similar to the user being located where the headphones 320 are located in FIG. 20. Similarly, VR goggles 322 are shown located behind the microphone 310C and between the drummer 316 and the other musicians 318. The content consumer device may select at least one audio stream to produce an audio experience for the user of the VR goggles 322 similar to the user being located where the VR goggles 322 are located in FIG. 20.

Smart glasses 324 are shown located fairly centrally between the microphones 310A, 310C and 310D. The content consumer device may select at least one audio stream to produce an audio experience for the user of the smart glasses 324 similar to the user being located where the smart glasses 324 are located in FIG. 20. Additionally, device 326 (which may represent any device capable of implementing the techniques of this disclosure, such as a mobile handset, a speaker array, headphones, VR goggles, smart glasses, etc.) is shown located in front of microphone 310B. Content consumer device 14 may select at least one audio stream to produce an audio experience for the user of the device 326 similar to the user being located where the device 325 is located in FIG. 20. While specific devices where discussed with respect to particular locations, a used of any of the devices depicted may provide an indication of a desired listening position that is different than depicted in FIG. 20. Any of the devices of FIG. 20 may be used to implement the techniques of this disclosure.

Figure 21:
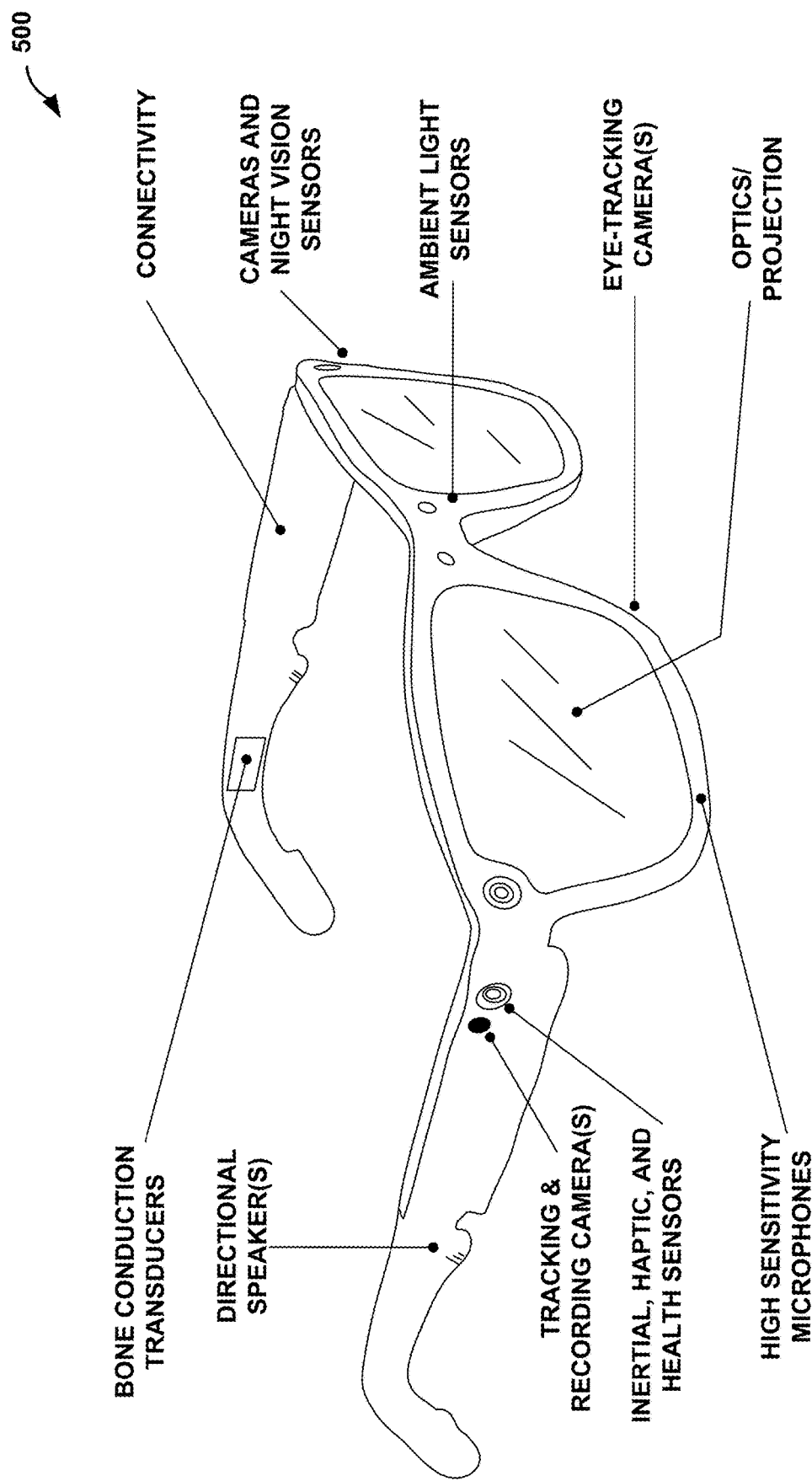
FIG. 21 is a diagram illustrating an example of a wearable device that may operate in accordance with various aspect of the techniques described in this disclosure.

FIG. 21 is a diagram illustrating an example of a wearable device 500 that may operate in accordance with various aspect of the techniques described in this disclosure. In various examples, the wearable device 500 may represent a VR headset (such as the VR device 400 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 400, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, Wi-Fi, etc. The wearable device 500 also includes one or more ambient light sensors, and bone conduction transducers. In some instances, the wearable device 500 may also include one or more passive and/or active cameras with fisheye lenses and/or telephoto lenses. Although not shown in FIG. 19, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 19, wearable device 500 may include other types of sensors for detecting translational distance.

Although described with respect to particular examples of wearable devices, such as the VR device 400 discussed above with respect to the examples of FIG. 21 and other devices set forth in the examples of FIGS. 1A-1C and FIG. 2, a person of ordinary skill in the art would appreciate that descriptions related to FIGS. 1A-1C, FIG. 2, and FIG. 21 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 22A:
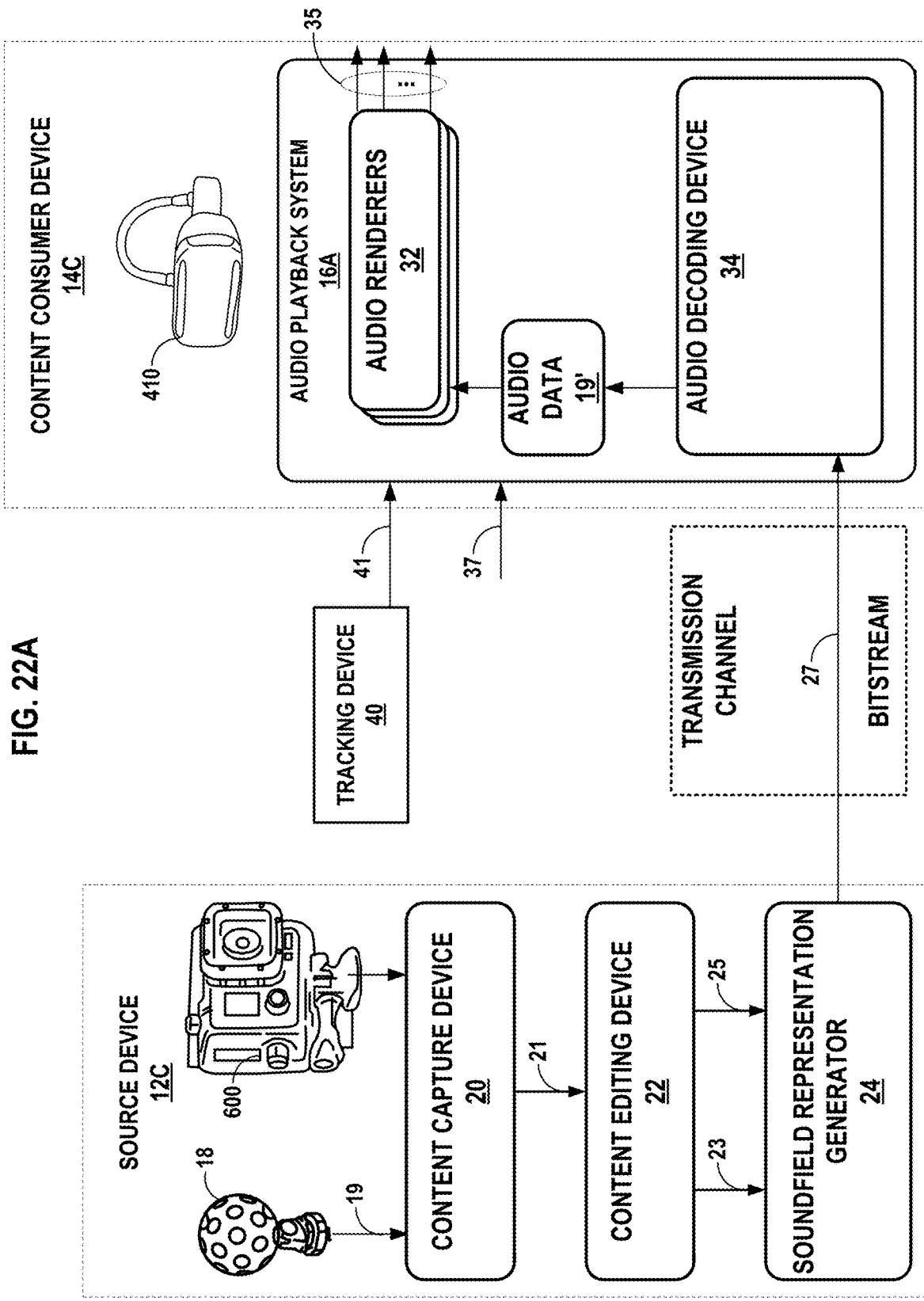
FIGS. 22A and 22B are diagrams illustrating other example systems that may perform various aspects of the techniques described in this disclosure.
Figure 22B:
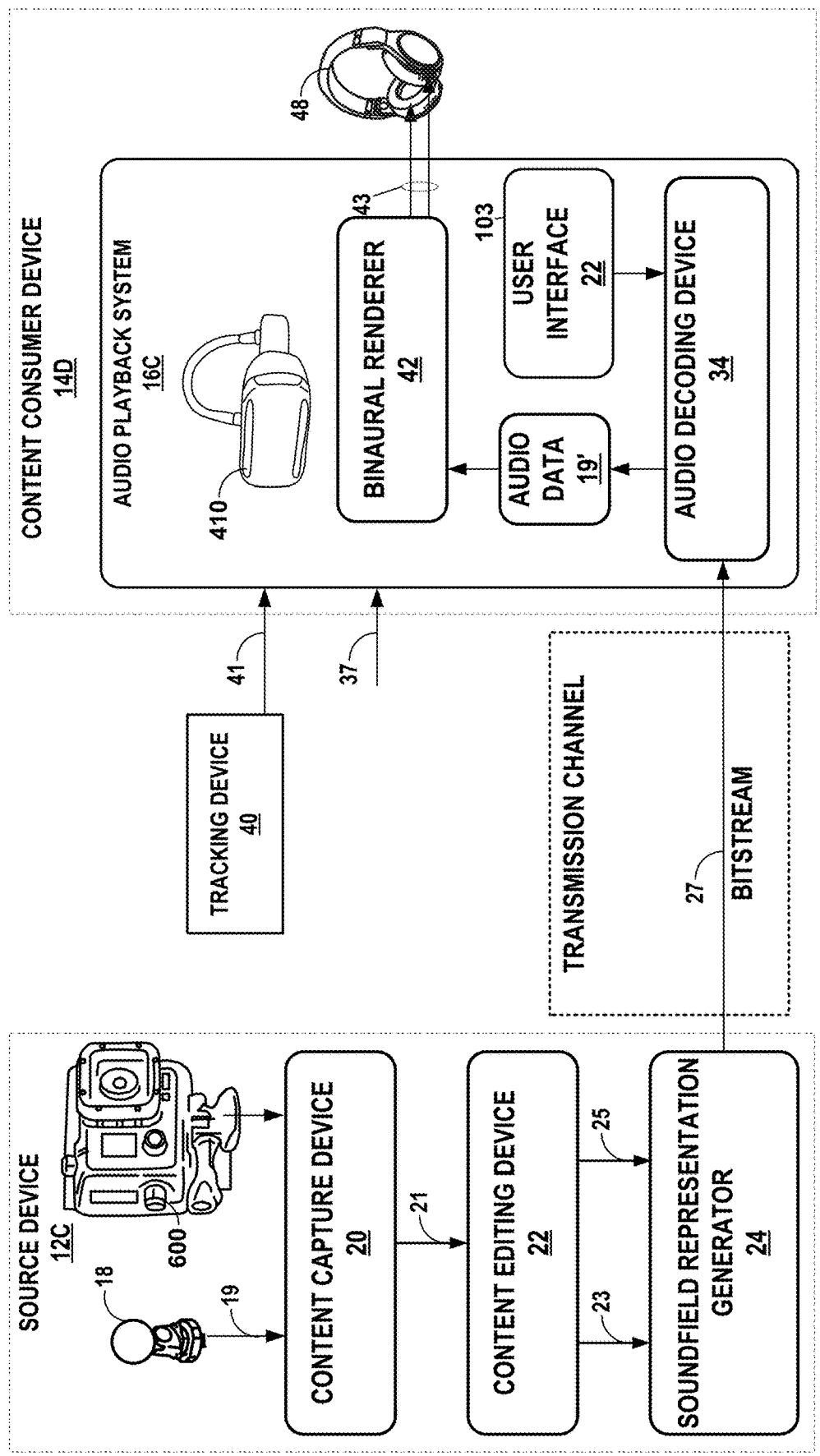

FIGS. 22A and 22B are diagrams illustrating example systems that may perform various aspects of the techniques described in this disclosure. FIG. 22A illustrates an example in which the source device 12C further includes a camera 600. The camera 600 may be configured to capture video data, and provide the captured raw video data to the content capture device 20. The content capture device 20C may provide the video data to another component of the source device 12C, for further processing into viewport-divided portions.

In the example of FIG. 22A, the content consumer device 14C also includes the wearable device 410. It will be understood that, in various implementations, the wearable device 410 may be included in, or externally coupled to, the content consumer device 14. The wearable device 410 includes display hardware and speaker hardware for outputting video data (e.g., as associated with various viewports) and for rendering audio data.

FIG. 22B illustrates an example in which content consumer device 14D has the audio renderers 32 shown in FIG. 22A replaced with a binaural renderer 42 capable of performing binaural rendering using one or more HRTFs or the other functions capable of rendering to left and right speaker feeds 43. The audio playback system 16C may output the left and right speaker feeds 43 to headphones 44.

The headphones 44 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 44 may recreate, based on the left and right speaker feeds 43, the soundfield represented by the audio data 19'. The headphones 44 may include a left headphone speaker and a right headphone speaker which are powered (or, in other words, driven) by the corresponding left and right speaker feeds 43.

Figure 23:
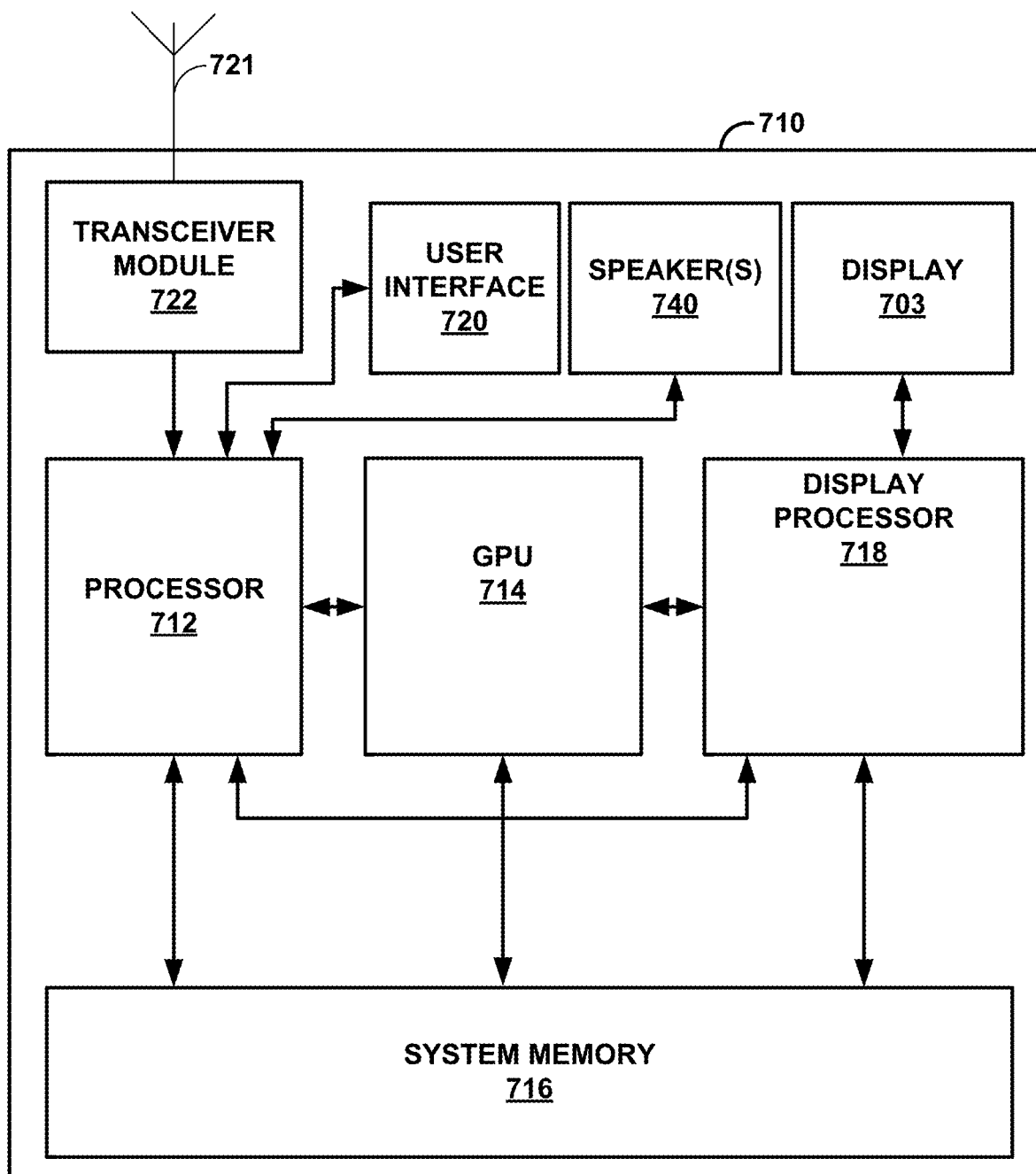
FIG. 23 is a block diagram illustrating example components of one or more of the source device, the content consumer device shown in the example of FIG. 1A-FIG. 1C and the multistream encoder or the playback device 348 of FIG. 14, or the playback device of FIG. 17.

FIG. 23 is a block diagram illustrating example components of one or more of the source device 12, the content consumer device 14 shown in the example of FIGS. 1A-FIG. 1C, the multistream encoder 340, the playback device 348 of FIG. 14, or the playback device 368 of FIG. 17. In the example of FIG. 23, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (i.e., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (i.e., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may comprise one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, Wi-Fi, a person area network (PAN) protocol, such as Bluetooth™, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 24:
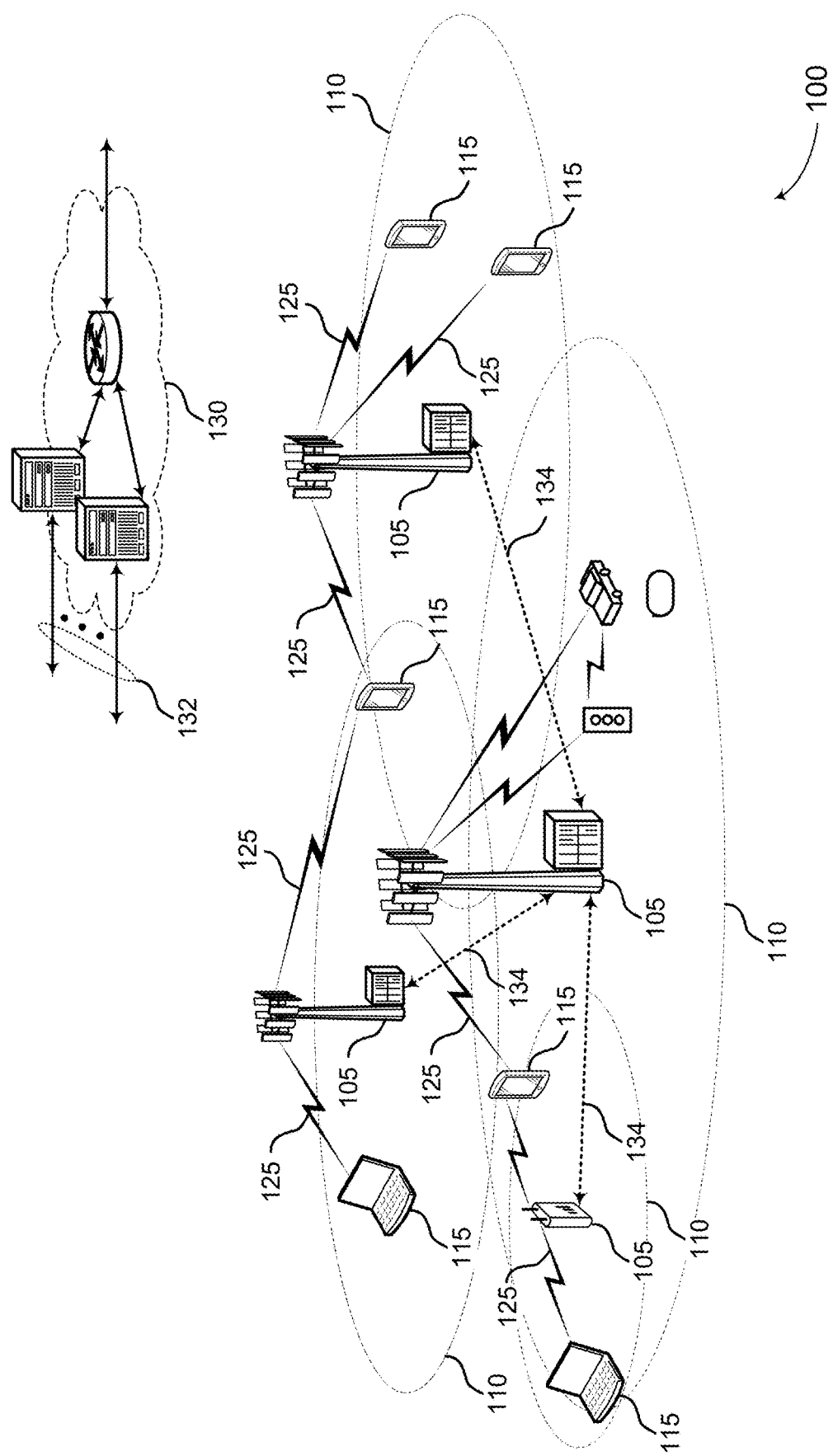
FIG. 24 illustrates an example of a wireless communications system 100 that supports devices and methods in accordance with aspects of the present disclosure.

FIG. 24 illustrates an example of a wireless communications system 100 that supports the devices and methods in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a $5^{th}$ generation (5G) cellular network or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro, 5G cellular, or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio information, such as metadata, indicating privacy restrictions and/or password-based privacy data to toggle, mask, and/or null various audio streams and/or audio sources as will be described in more detail below.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, 5G cellular technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
   a memory configured to store audio data and location data associated with a plurality of audio streams; and
   one or more processors coupled to the memory, and configured to:
      obtain a first location of a first audio stream that includes an audio source;
      obtain a second location of a second audio stream that includes the audio source;
      generate a first direction vector originating at the first location, based on a location of the audio source and the first location;
      generate a second direction vector originating at the second location, based on the location of the audio source and the second location;
      determine parameters that describe a vector field based on the first direction vector and the second direction vector;
      determine a listener position within the vector field;
      obtain a location of a third audio stream;
      obtain a location of an occlusion element that occludes a set of flow lines of the vector field; and
      modify the vector field, at the listener position, based on a calculation of a plurality of flow lines within the vector field from the third audio stream to the listener position based on a subset of the plurality of the flow lines being modified based on the occlusion element.

2. The device of claim 1, wherein the one or more processors are further configured to render an audio soundfield based on the parameters and the listener location.

3. The device of claim 1, further comprising a transmitter configured to transmit the parameters to a rendering device.

4. The device of claim 1, wherein as part of determining the parameters, the one or more processors are configured to perform a regression or least means square of the first direction vector and the second direction vector.

5. The device of claim 1, wherein as part of the determine parameters, the one or more processors are configured to:
   determine a first plane wave translation of the first audio stream to generate a first wave translated audio stream;
   determine a second plane wave translation of the second audio stream to generate a second wave translated audio stream; and
   correlate first order components of the first plane wave translated audio stream with the second plane wave translated audio stream.

6. The device of claim 5, wherein the one or more processors are configured to determine a covariance and a linear invertible transform for one of the first or the second plane wave translated audio streams, and wherein the linear invertible transform comprises a singular value decomposition.

7. The device of claim 5, wherein the one or more processors are further configured to determine a nearest audio stream of the plane wave translated audio streams to the listener position, wherein the first or the second one of the plane wave translated audio streams comprises the nearest audio stream.

8. The device of claim 5, wherein the one or more processors are further configured to:
   determine a respective delay for each of the first and the second plane wave translated audio streams; and
   apply the respective delay to each of the first and the second plane wave translated audio streams.

9. The device of claim 5, wherein the one or more processors are further configured to convert the first and the second plane wave translated audio streams to ambisonic audio streams at the listener position.

10. The device of claim 1, wherein the device comprises a mobile handset capable of six degrees of freedom movement associated with the listener position.

11. The device of claim 1, wherein the device comprises a wearable device capable of six degrees of freedom movement associated with the listener position.

12. The device of claim 1, wherein the device further comprises a demultiplexer configured to demultiplex the encoded audio data and the location data from a bitstream, and wherein the audio data is encoded audio data and the one or more processors are further configured to decode the encoded audio data associated with the first audio stream and the second audio stream to determine decoded audio data.

13. The device of claim 1, wherein the device further comprises a multiplexer configured to multiplex the encoded audio data and the location data into a bitstream, and wherein the one or more processors are further configured to encode the audio data associated with the first audio stream and the second audio stream to determine encoded audio data.

14. The device of claim 1, wherein at least one of the first audio stream and the second audio stream is an ambisonic stream.

15. The device of claim 1, wherein at least one of the first audio stream and the second audio stream is an audio object.

16. The device of claim 1, wherein the one or more processors are further configured to beam warp the first audio stream and the second audio stream at the listener position.

17. The device of claim 1, wherein the one or more processors are further configured to extrapolate a height of a sound field represented by the vector field and based on the parameters in response to a change of a coordinate representing a height at the listener location.

18. The device of claim 1, wherein generate the first direction vector originating at the first location is based on an inverse based on an energy of the audio source at the first location.

19. The device of claim 1, wherein generate the second direction vector originating at the second location is based on an inverse based on an energy of the audio source at the second location.

20. The device of claim 1, wherein the third audio source is a mono audio source.

21. The device of claim 20, wherein the mono audio source is captured by an additional microphone located on the device.

22. The device of claim 21, wherein the additional microphone is a spot microphone.

23. The device of claim 21, further comprising one or more processors configured to generate a third direction vector originating at the location of the mono audio source.

24. The device of claim 23, wherein the third direction vector is included in the determination of the parameters that describe the vector field that include the plurality of flow lines.

25. The device of claim 24, wherein the vector field is included in a vector field interpolation between the location of the mono audio source and the location of the first audio stream, wherein the first audio stream is the nearest vector stream.

26. The device of claim 24, wherein the vector field is included in a vector field interpolation to interpolated to the location of the mono audio source to the location of the listener location, using the first audio stream, wherein the first audio stream is a nearest vector stream.

27. A method comprising:
obtaining a first location of a first audio stream that includes an audio source;
obtaining a second location of a second audio stream that includes the audio source;
generating a first direction vector originating at the first location, based on a location of the audio source and the first location;
generating a second direction vector originating at the second location, based on the location of the audio source and the second location;
determining parameters that describe a vector field based on the first direction vector and the second direction vector;
determining a listener position within the vector field;
obtaining a location of a third audio stream;
obtaining a location of an occlusion element that occludes a set of flow lines of the vector field; and
modifying the vector field, at the listener position, based on a calculation of a plurality of flow lines within the vector field from the third audio stream to the listener position based on a subset of the plurality of the flow lines being modified based on the occlusion element.

28. The method of claim 27, further comprising rendering an audio soundfield based on the parameters.

29. The method of claim 27, further comprising transmitting the parameters to a rendering device.

30. The method of claim 27, wherein determining the parameters comprises performing a regression or least means square of the first direction vector and the second direction vector.

31. The method of claim 27, wherein the determining the parameters comprises:
determining a first plane wave translation of the first audio stream for generating a first wave translated audio stream;
determining a second plane wave translation of the second audio stream for generating a second wave translated audio stream;
correlating first order components of the first plane wave translated audio stream with the second plane wave translated audio streams.

32. The method of claim 31, determining a covariance and a linear invertible transform for one of the first or second plane wave translated audio streams, and wherein the linear invertible transform comprises a singular value decomposition.

33. The method of claim 31, further comprising determining a nearest audio stream of the plane wave translated audio streams to the listener position, wherein the first or the second one of the plane wave translated audio streams comprises the nearest audio stream.

34. The method of claim 31, further comprising:
determining a respective delay for each of the first and the second plane wave translated audio streams; and
applying the respective delay to each of the first and the second plane wave translated audio streams.

35. The method of claim 31, further comprising:
convert the first and the second plane wave translated audio streams to ambisonic audio streams at the listener position.

36. The method of claim 27, wherein at least one of the first audio stream and the second audio stream is an ambisonic stream.

37. The method of claim 27, wherein at least one of the first audio stream and the second audio stream is an audio object.

38. A non-transitory computer-readable storage medium having stored thereon instructions that, when executed, cause one or more processors to:

obtain a first location of a first audio stream that includes an audio source;
obtain a second location of a second audio stream that includes the audio source;
generate a first direction vector originating at the first location, based on a location of the audio source and the first location;
generate a second direction vector originating at the second location, based on the location of the audio source and the second location;
determine parameters that describe a vector field based on the first direction vector and the second direction vector;
determine a listener position within the vector field;
obtain a location of a third audio stream;
obtain a location of an occlusion element that occludes a set of flow lines of the vector field; and
modify the vector field, at the listener position, based on a calculation of a plurality of flow lines within the vector field from the third audio stream to the listener position based on a subset of the plurality of the flow lines being modified based on the occlusion element.

39. A device comprising:

means for obtaining a first location of a first audio stream that includes an audio source;
means for obtaining a second location of a second audio stream that includes the audio source;
means for generating a first direction vector originating at the first location, based on a location of the audio source and the first location;
means for generating a second direction vector originating at the second location, based on the location of the audio source and the second location;
means for determining parameters that describe a vector field based on the first direction vector and the second direction vector;
means for determining a listener position within the vector field;
means for obtaining a location of a third audio stream;
means for obtaining a location of an occlusion element that occludes a set of flow lines of the vector field; and
means for modifying the vector field, at the listener position, based on a calculation of a plurality of flow lines within the vector field from the third audio stream to the listener position based on a subset of the plurality of the flow lines being modified based on the occlusion element.

* * * * *